(12) United States Patent
Gupta

(10) Patent No.: US 11,086,880 B2
(45) Date of Patent: *Aug. 10, 2021

(54) SYSTEMS AND METHODS FOR LOSSY DATA COMPRESSION USING KEY ARTIFACTS AND DYNAMICALLY GENERATED CYCLES

(71) Applicant: Dev Gupta, San Francisco, CA (US)

(72) Inventor: Dev Gupta, San Francisco, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 16/684,368

(22) Filed: Nov. 14, 2019

(65) Prior Publication Data
US 2020/0089683 A1    Mar. 19, 2020

Related U.S. Application Data

(63) Continuation of application No. 15/395,398, filed on Dec. 30, 2016, now Pat. No. 10,509,788.

(51) Int. Cl.
| | | |
|---|---|---|
| *G06F 16/2455* | (2019.01) | |
| *G06F 16/248* | (2019.01) | |
| *G06F 16/25* | (2019.01) | |
| *H04L 29/08* | (2006.01) | |
| *H04L 29/12* | (2006.01) | |

(52) U.S. Cl.
CPC ...... *G06F 16/24568* (2019.01); *G06F 16/248* (2019.01); *G06F 16/258* (2019.01); *H04L 61/00* (2013.01); *H04L 67/1002* (2013.01); *H04L 67/32* (2013.01)

(58) Field of Classification Search
None
See application file for complete search history.

(56) References Cited

U.S. PATENT DOCUMENTS

| | | |
|---|---|---|
| 8,326,727 B2 | 12/2012 | Aymeloglu et al. |
| 2002/0130868 A1 | 9/2002 | Smith |

(Continued)

FOREIGN PATENT DOCUMENTS

| | | |
|---|---|---|
| CN | 1666528 A | 9/2005 |
| CN | 101260804 A | 9/2008 |

(Continued)

OTHER PUBLICATIONS

Written Opinion for related Singaporean Application No. 11201906066P, dated Nov. 12, 2020 (7 pages).

(Continued)

*Primary Examiner* — Jason G Liao
(74) *Attorney, Agent, or Firm* — Procopio, Cory, Hargreaves & Savitch LLP

(57) ABSTRACT

Systems and methods for lossy data compression using key artifacts and dynamically generated cycles are described, including receiving a data stream of relational data; detecting an artifact in the data stream associated with a critical point in the relational data; analyzing, by a processing device, the artifact to determine a set of artifacts associated with a complex event where the critical point is an endpoint of the complex event; calculating one or more cycle metrics based on the set of artifacts; generating a data structure associated with the complex event and cycle metrics; providing the data structure for marking a display of the relational data with the complex event based on the cycle metrics.

12 Claims, 21 Drawing Sheets

(56) References Cited

U.S. PATENT DOCUMENTS

| | | | |
|---|---|---|---|
| 2003/0018802 A1* | 1/2003 | Romanik | H04L 29/06 709/234 |
| 2011/0075729 A1 | 3/2011 | Dane et al. | |
| 2013/0326116 A1 | 12/2013 | Goss et al. | |
| 2015/0036946 A1 | 2/2015 | Haik et al. | |
| 2016/0105728 A1 | 4/2016 | Schmidmer et al. | |
| 2017/0249445 A1 | 8/2017 | Devries et al. | |

FOREIGN PATENT DOCUMENTS

| | | | |
|---|---|---|---|
| JP | 2002-340671 A | 11/2002 | |
| WO | 2008055202 A2 | 5/2008 | |
| WO | 2016081778 A1 | 5/2016 | |

OTHER PUBLICATIONS

Notice of the First Office Action for related Chinese Patent Application No. 201780087785.2, dated Feb. 25, 2020; English translation provided (13 pages).

Fibbonaci Retracements date unknown [captured on Dec. 10, 2015 by archive.org], stockcharts.com, https://web.archive.org/web/20151210022928/https://stockcharts.com/school/docu.php?id=chart_school:chart_analysis:fibonacci_retracemen.

FMR LLC, Wealth-Lab Pro User Guide, Version 6.9, 2015, 352 pgs.

International Search Report and Written Opinion issued in co-pending international application No. PCT/US2017/069001, dated Jun. 20, 2018 in 11 pages.

Stockcharts.com, Ulcer Index, 2016, 7 pgs., [online] URL: http://stockcharts.com/school/doku.php?id=chart_school:tehnical_indicators:ulcer_index.

Trading Blox, LLC, Trading Blox User's Guide, 2016, 456 pgs.

Wealth-Lab Pro Version 6.9 WealthScript Programming Guide Dec. 2, 2015, Fidelity Investments, https://www.fidelity.com/bin-public/060_www_fidelity_com/documents/wlp_programming_guide.pdf.

* cited by examiner

```
type alias Xval = Float
type alias Yval = Float
type alias Percentage = Float
type alias DataPoint = (Xval, Yval)

type alias Process = {
  GrowthMode: Bool           -- True if we've broken breakeven,
                                False if we are looking for breakeven
, CrestThreshold: Float      -- Threshold that determines a new cycle
, Nth: Integer               -- The Nth data point to be analyzed
} type alias Cycle = {
  DropPercent: Percentage
, GrowthPercent: Percentage
, AbsPeak_AP: DataPoint
, Trough_T: DataPoint
, Endpoint: Boolean          -- Is this an incomplete cycle
                                at beginning or ending
} type alias Indicator = {
  Point : DataPoint
, Value: Percentage
, Type: String
} type alias CompressedDataStream = {
  CycleList : List Cycle
, Indicators : List Indicator
}
```

FIG. 3B

| Cycles & Indicators | Reason for Change Metrics |
|---|---|
| Drop Percentage Change | Drop Reason |
| Recovery Percentage Change | Recovery Reason |
| Growth Percentage Change | Growth Reason |
| Total Percentage Change | Total Change Reason |
| Period % Change | Periodic Change Reason |
| User Defined Zone % Change | User Defined Zone Return Reason |

Possible Reasons Include: Network attack, heart beat, event start, blood pressure, heart attack, earthquake, virus infection, global warming, population injury, financial crisis, devaluation, abnormality and recovery, population anomaly, etc.

FIG. 6

Ticker Box Options

| Example: | Purpose: |
|---|---|
| ?Real Estate | Searches for occurrences of "Real Estate" in categories names and investments names and provides the list. |
| SPY, AGG | Draws a total return (performance) chart of SPY & AGG on separate charts |
| AGG, -AGG | -AGG strips out the dividends & distributions and provides a Price Chart. This is what the normal charting tools like Yahoo Finance & Google Finance provide. This example draws the performance and price charts of AGG on separate charts. |
| (60 SPY 40 AGG) | Draws a combined portfolio (e.g. 60% SPY and 40% AGG). The first data point assumes $60 is in SPY and $40 in AGG. The growth of $100 is plotted over time and dividends are assumed to be reinvested. |
| [SPY AGG] | Draws a relative value chart of SPY and AGG. Both are plotted on the same chart, each value starting with $100, with dividends and distributions reinvested. |
| #Keyword | Finds and displays all charts with the #Keyword in the Note field of the chart. For example, if you entered #MyInvestments in the Note box for 5 of your personal investments, those 5 investments will be shown. Use this to create a #Watch, or #Buy, or any other combination. |

FIG. 14C

SYSTEMS AND METHODS FOR LOSSY DATA COMPRESSION USING KEY ARTIFACTS AND DYNAMICALLY GENERATED CYCLES

CROSS-REFERENCE TO RELATED APPLICATIONS

This application is a continuation of U.S. application Ser. No. 15/395,398, filed Dec. 30, 2016, the disclosure of which is incorporated by reference herein in its entirety.

BACKGROUND

Field

Aspects of the example implementations discussed herein relate generally to data processing and, more particularly, to the summarization, distribution, compression, storage, and visualization of compressed data using a series of dynamically generated cycles.

Related Art

Related art data sources are analyzed and compressed at a networked server device or a client device. Compression is used in the related art to process data and/or transfer the data with fewer bits than the original representation. Typically, compression helps to optimize resources, including transmission, latency, capacity, power, and data storage. However, the design of data compression schemes involves trade-offs among various factors. In lossy data compression schemes, the tradeoff can involve dropping detail from the data source to improve central processing unit (CPU) utilization, improve network transmission, and permit quick comparisons and visualizations. Comparisons may use differential compressions, producing a series of technical artifacts that describe the difference between two data sets. Compression schemes exist for audio and video signal processing and other data streams.

Related art charting tools may visualize a raw data source but they do not overlay or highlight the key points of the compressed data. Related art visualization tools do not separate the noisy data from the essential data.

SUMMARY

The subject matter discussed herein includes methods for compressing data streams into a series of metrics including, but not limited to, dynamically finding key artifacts such as high points (peak points), low points (trough points), breakeven points, interval points, user defined points and generating the percentage difference between these artifacts, which is called cycle metrics. Many data streams have a high signal to noise ratio, and the lossy compression scheme discussed herein can take advantage of this by filtering out the noisy data that may be unimportant to the user, and keep the data that may be relevant to the user. Data streams can have high turbulence and repetition of similar data. The change in the turbulence can sometimes be the most relevant signal in the data. This data processing mechanism can identify and characterize changes in the turbulence and can vastly reduce the size of the data and also may enhance the signal quality to the user.

This type data compression can be applied to any multi-dimensional data stream using pairwise X and Y values for N dimensions, with N*(N−1) combinations of X and Y data pairs. The X and Y values can represent any relationship between two values such as time, date, volume, frequency, amount, load, occurrences, latency, money, power, pulse, energy, investment value, denial attempts, connections, temperature, etc.

The subject matter includes methods for implementing compression to generate a series of cycle metrics including receiving a data stream of relational data; detecting a key artifact in the data stream associated with a critical point in the relational data; analyzing the key artifact to determine a set of artifacts associated with a complex event where the critical point is an endpoint of the complex event; calculating one or more cycle metrics based on the set of artifacts; generating a data structure to describe the complex event and cycle metrics; and providing the data structure for marking a display of the relational data with the complex event based on the cycle metrics. The compressed data can be efficiently processed, transferred, analyzed, compared, stored and visualized. The computational effort to compress the data stream at various resolutions can be divided between the client and server, and load balanced as needed.

According to an aspect, a computer-implemented method of processing a data stream is provided, a processing device can determine key artifacts associated with a largest peak point between any two arbitrary points of the data stream from (X, Y), and (X', Y'). The trough point of the cycle can be determined as the lowest point after a peak point. The breakeven point can be determined as the first point after the lowest point that is substantially equal to the peak point. Another key artifact can be determined as the first peak point after the breakeven point that is beyond (X', Y'). In this aspect, the data stream is analyzed to detect key artifact as a set of artifacts associated with a complex event, calculate cycle metrics, and compressed into a data structure to describe the complex event and cycle metrics. For example, a series of cycle metrics can include the drop percentage from the peak point to the lowest point and the growth percentage from the breakeven point to the next peak point. Cycle metrics can include a combination of a drop, recovery, and growth percentages, as described in greater detail herein. Semantically, the cycle metrics can be computed against the data stream forward or backward, in its entirety, or for a subset. The resolution of the compression can be specified in many ways. For example, the resolution of the compression can be specified by calculating cycle metrics with drop percentages greater than X % which can be referred to as a crest percentage. In an example, the resolution can be specified by calculating the N largest cycle metrics which represents the N largest drop percentages of the data stream.

According to another aspect, a computer-implemented method of processing a data stream is provided, where metrics are calculated at regular intervals, or as specified by a user via indicators or event markers. The data stream can be compressed into a series of percentage changes or metrics at regular intervals or ad hoc, as specified by the user.

BRIEF DESCRIPTION OF THE DRAWINGS

FIG. 3B illustrates an example data structure FIG. 4 provides a visualization for a dynamically generated compressed data stream of cycle metrics as well interval metrics, indicators, events and markers.

FIG. 6 provides a matrix of cycle metrics & indicators with associated example reasons

FIG. 14A-C illustrate example applications for market index data.

DETAILED DESCRIPTION

Figure 1:
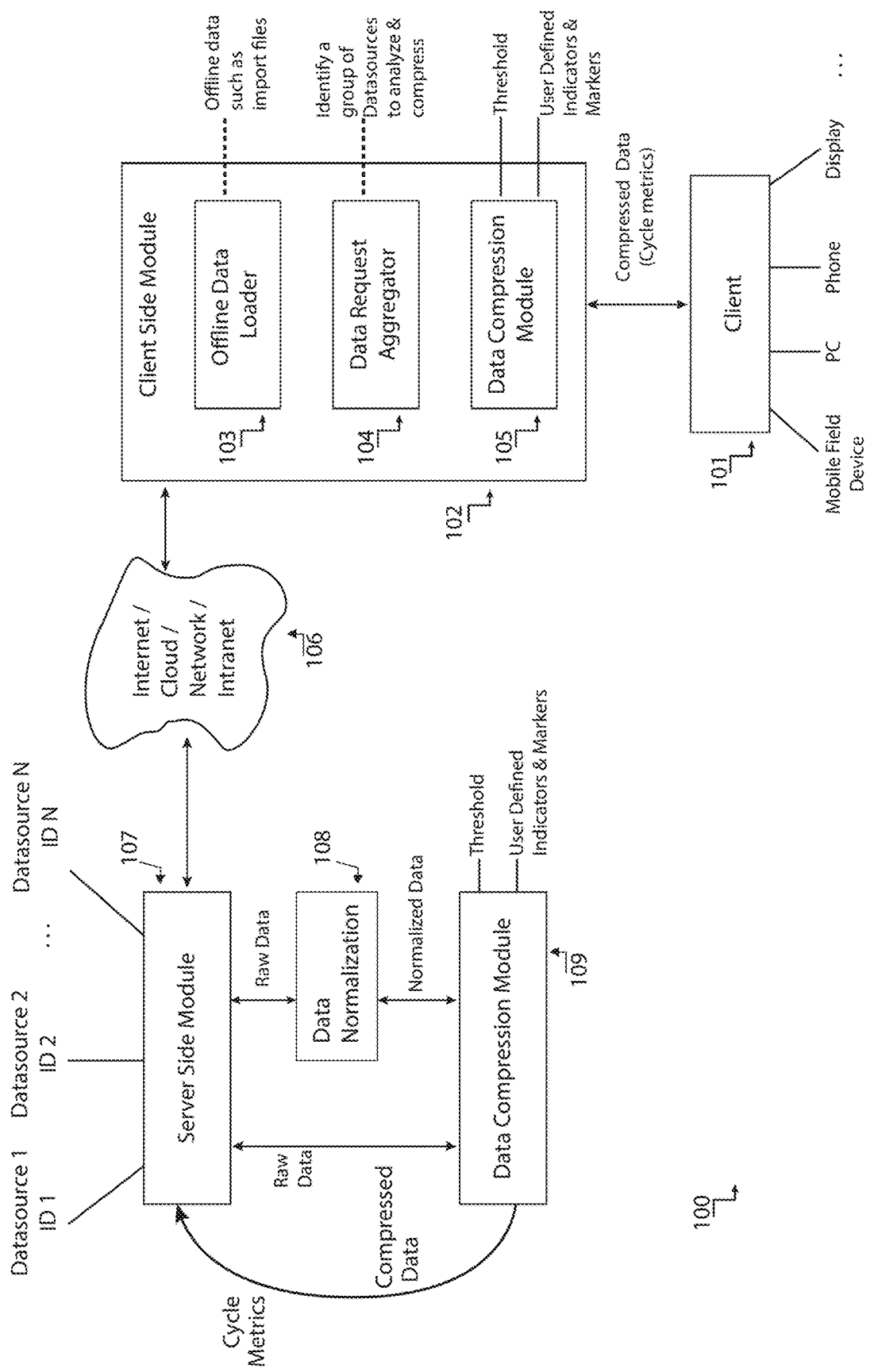
FIG. 1 shows an example architecture in accordance with one or more example implementations.

The subject matter described herein is taught by way of example implementations. Various details have been omitted for the sake of clarity and to avoid obscuring the subject matter.

Supposed two hikers climb to the apex of a mountain using different paths starting from the same elevation but on different sides of the mountain. The first hiker chooses an inefficient path which takes him up and down several large hills on his way to the apex. The second hiker chooses an efficient path which is close to a straight line from the bottom to the top of the mountain with minor drops. Suppose the hiker's elevation is plotted over time in an (X, Y) chart with X as time and Y as elevation. The (X, Y) data stream for the first hiker would show large drops in elevation on the path to the apex with large intermediate peaks and troughs. The elevation chart of the second hiker would mostly be a straight line to the apex with minor drops in elevation.

Conventional methods may use statistical methods such as standard deviation to measure the volatility for each hikers' path. Since the first hiker deviates the most from a straight-line path it is statistically more volatile and therefore may be considered less desirable. However, conventional statistical methods are dependent on the period being analyzed. So, if only the last two hours of the hiker's data stream are analyzed, it could conflict with volatility measures from the first two hours.

This invention discretely identifies key cycles in the data and highlights the movement of data from peak to trough, then to the breakeven point, and then to the new peak. The user can highlight key artifacts on the chart, such as "show me all the drops greater than 5%" or "show me the top 5 drops on the chart." Key points can be identified over intervals as checkpoints (i.e. what's each hiker's elevation every 30 minutes). The invention normalizes the data so they can be compared (i.e. suppose the first hiker took an elevation reading every 5 minutes and the second hiker took one every 10 minutes). The invention allows the data streams to be labeled, aggregated, and uniquely identified. It allows multiple data streams to be visualized on charts all at once, either stacked one-on-top of the other, or on the same chart. The invention allows the user to visualize discrete differences in the data streams. It allows the user to zoom into the data stream and recalculate the peak to trough cycles. It allows the charts to synchronize the start and end points, interval lengths, and time periods. It allows the user to combine data sources and compare them to other data sources.

The examples shown below are directed to structures and functions for compressing data streams into a series of cycle metrics including, but not limited to, dynamically finding key artifacts such as high points (e.g., peak points or local maximum points), low points (e.g., trough points or local minimum points), setback points, breakeven points, interval points, user specified points and generating the percentage differences between these artifacts, which are called cycle metrics.

Architecture

FIG. 1 shows an example architecture 100 in accordance with one or more example implementations. A client 101 can include an interface with a user using, for example, a mobile field device (MFD), personal computer (PC), phone, display, etc. The client 101 can include, but not by way of limitation, a processor, a memory, a user input device, an user output device, etc.

The client 101 communicates with a client side module 102. The client side module 102 can include an offline data loader 103 associated with offline data, such as import files. The client side module 102 includes a data request aggregator 104 that may identify a group of data sources to analyze and compress. The data request aggregator 104 bundles a request for data sources (e.g., Datasource 1 ID 1, Datasource 2 ID 2 . . . Datasource N ID N, etc.) by, for example, providing unique identifiers. A data compression module 105 or data compression module 109 permits the client side module 102 and server side module 107 to load balance the computational effort of the compression. The data compression module 109 and 105 can also cache the compression for unique data sources to optimize processing time, improve latency, and reduce power consumption. The resolution of the compression by the data compression module 105 can be determined by a crest and/or user defined zone. As discussed below, the server side module 107 may compress the data source using a crest percentage of, for example, 0% and then transfer the compressed data to the client side module 102. The client side module 102 can further compress the data to a crest of, for example, 5% before passing it to the client device 101 for analysis and/or visualization. Since the data can be cached, at a later time, the user may request a crest of, for example, 7% which can be determined by the client using the cached data stream with a 5% crest.

This request permits the server side module 107 and the client side module 102 to load balance the compression processing based on the physical deployment environment and architecture 100. For example, a Mobile Field Device (MFD) may have limited processing power to compress the data. Thus, the server side module 107 can perform a bulk of the compression. A networked PC client 101 may have sufficient processing power and network bandwidth to allow the client side module 102 to perform a significant amount of compression processing thereby promoting scalability.

The client side module 102 communicates with the server side module 107, for example, via a communication channel such as Internet, cloud, communication network, or an intranet at 106. The server side module 107 fetches the data sources (e.g., Datasource 1 ID 1, Datasource 2 ID 2 . . . Datasource N ID N, etc.) requested by the client side module 102. The server side module 107 can include a data normalization module 108 to normalize multiple data sources.

The data normalization module 108 process may include aligning interval values on the X axis. For example, to normalize an X axis as Time, the data normalization module 108 can receive two data sources—one data source with daily data and the other data source with monthly data. The data normalization module 108 may transform the daily data source to monthly intervals so the two data sources have matching monthly intervals instead of mismatched monthly and daily intervals. This can facilitate comparisons and visualizations of the two data sources. Furthermore, comparisons using the compressed cycle metrics can differentiate between normal patterns and abnormal patterns. For example, after normalizing the data, the average peak to trough percentages, recovery duration, average growth and duration percentages can be calculated for a normal data stream. These averages and parameters can then be applied to other data streams and the abnormal data beyond the normal thresholds can be identified and visualized. For example, if normal drops usually average 4%, the system can compress the data to only show drops greater than 4% to identify the abnormalities. In this case, drops less than 4% are compressed out of the data stream as non-essential data and only the essential drops greater than 4% are highlighted.

The data can be normalized by the data normalization module 108, and the data compression module at 109 can compress the data to extract key artifacts. The data normalization module 108 and data compression module 109 can operate in parallel to optimize performance.

Cycle metrics are passed back to the server side module 107, which transfers the cycle metrics via a secure or unsecure network 106 back to the client side module 102.

In some example implementations, the server side module 107 transmits a data structure to a remote device with access to the data stream so that the remote device can display relational data marked with the set of artifacts based on the data structures and generate a display of the relational data labeled with event information based on the identified locations.

In some implementations, the client side module 102 can receive a data stream of relational data and plurality of event data structures, where each event data structure describes a complex event and cycle metrics associated the complex event. The client side module 102 identifies locations in the relational data associated with the plurality of event data structures, and generates a display of the relational data. The display can include identifying event information associated one or more event data structures based on one or more cycle metrics.

Compression & Artifact Specification

According to another aspect, a computer-implemented method of processing a data stream is provided. Key artifacts are dynamically detected such as high points (peak points), low points (trough points), setback points, breakeven points, interval points, user defined points and the different percentages between these artifacts, which is called metrics markers. This processing occurs by the data compression module at 105 and 109 which permits load balancing and caching at the client and server.

A set of artifacts can include (but is not limited to) a benchmark artifact indicating a relational value comparable to a relational value associated with the key artifact and a peak artifact indicating a relative change based on the key artifact, where the peak artifact is associated with another critical point after the benchmark artifact. The processor can identify a range based on the key artifact and the benchmark artifact, where the range includes a local peak value. The processor can continue to identify additional ranges based on the benchmark artifact and additional peak artifacts.

Figure 2:
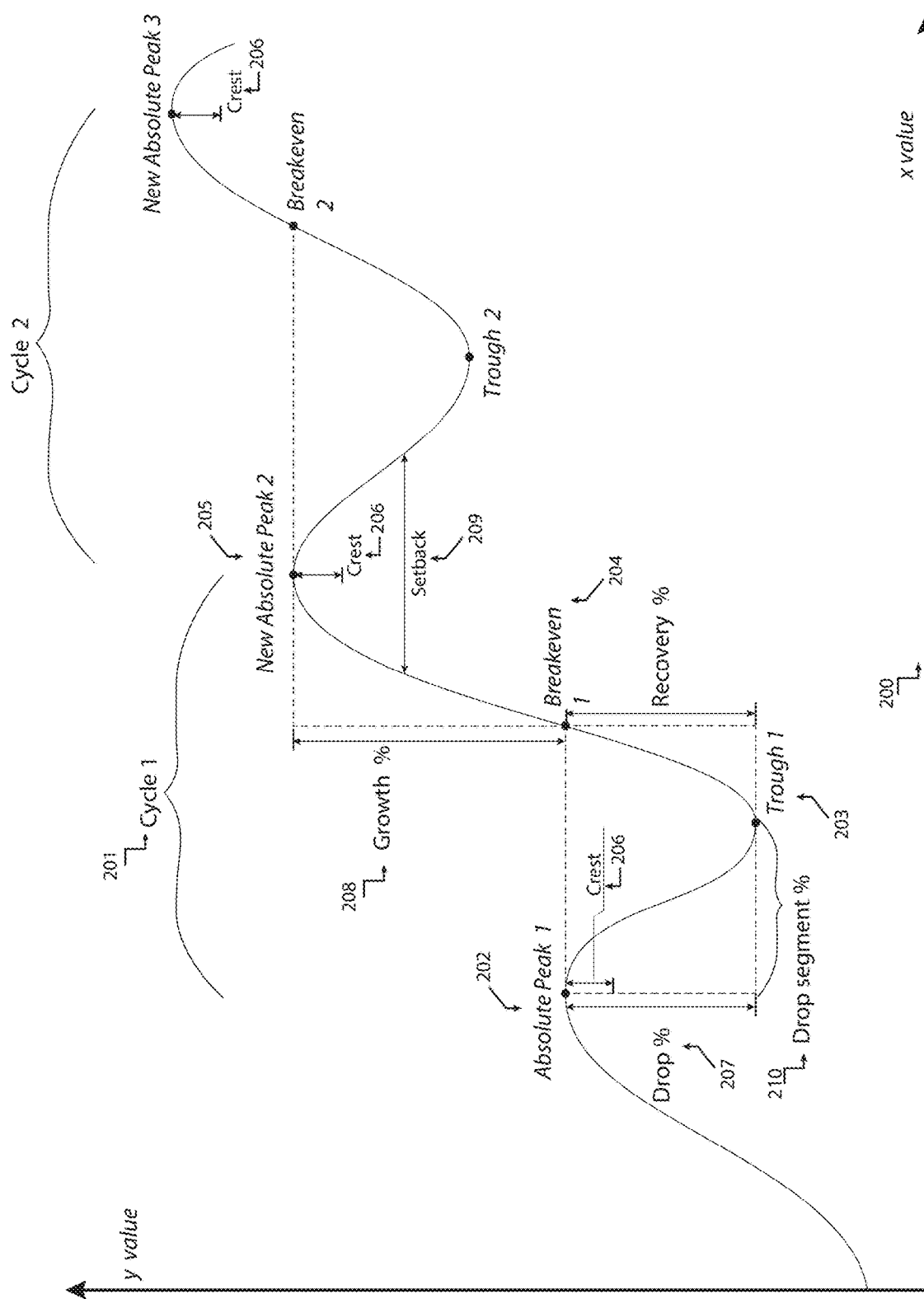
FIG. 2 shows how technical artifacts and cycle metrics can be defined in a data stream.

FIG. 2 shows the examples of the artifacts and cycles. As shown in FIG. 2, the data stream is compressed from raw X & Y values by identifying key points such as the absolute peak, trough, breakeven, and new absolute peak. Absolute peaks are a Y value that is greater than any preceding Y value in a subset of the data stream being analyzed. As an example, the absolute peak 202 is the largest Y value relative to all prior data points in the subset of the data stream being analyzed. In some example implementations, an absolute peak is not relative to the entire subset of the data stream but rather to all prior data points in the subset of the data stream. Intermediate peaks can be found in between the absolute peaks. Moreover, a smaller subset within the subset of the data stream can be used to reveal new absolute peaks, troughs, and breakeven points, which are relative to one another within the subset.

An example of a complete cycle, as shown in 201, is defined from:

An absolute peak (e.g., the local maximum point or the highest value relative to prior data points) at 202

Then to the trough (e.g., the local minimum point or the lowest point since last local maximum) at 203

Then to the breakeven point (same or next data point greater than the absolute peak) at 204

And then to the new absolute peak at 205 (e.g., a new local maximum point)

A data stream can have N number of cycles. The cycles can be collapsed depending on the desired resolution of the compression, as discussed later.

Percentages are calculated between the key points starting with the drop percentage from 202 to 203, then the recovery percentage from 203 to 204 (which can be mathematically derived from the drop percentage), followed by the growth percentage from 204 to 205. Collectively, these percentages at key points are called "cycle metrics".

The setback, as shown in 209 is another artifact of the data stream. The setback is based on an arbitrary user-defined data point with a (X,Y) value and defines previous X values that have the same Y. For example, 209 shows a line with data points on the right and left sides of the line. The setback associated with the data point on the left side of the line 209 is the data point on the right side of the line. A setback point can only be defined if there has been a drop from some absolute peak. A new absolute peak will not have an associated setback point.

Depending on the application, other key artifacts can be computed to describe the cycle. For example, the drop segment percentage at 210 can capture the X axis change that occurred while dropping from the absolute peak 202 to the trough 203.

Crest (Threshold) Definition

As shown in FIG. 2, the crest determines the resolution of the compressed (X,Y) data stream. The crest can also be referred to as a threshold percentage. The crest at 206 is used to determine a minimum drop percentage for a cycle to be considered a new cycle. For example, a crest of 10% will require the drop percentage for the data stream to be at least 10% in order to determine the absolute peak.

A crest of 0% provides the highest resolution of the compressed data stream and calculates cycle metrics regardless of the drop percentage size. A smaller crest can determine more cycles. A larger crest can determine fewer cycles.

The user can also select the resolution of the compression by specifying a number of cycles in the compressed data stream, e.g., finding the N largest drop percentages. For example, specifying a crest of 5 cycles compresses the data stream so the top five largest cycles are determined, each with the largest drop percentages relative to the data stream. This is calculated by applying a 0% crest to the data stream and then filtering out all cycles except the ones with the 5 largest drop percentages. The fifth largest drop percentage can be used as the new crest for the data stream and the cycles can be recomputed. The recomputation can be optimized using the techniques as outlined herein.

Compression Process Algorithm

Figure 3A:
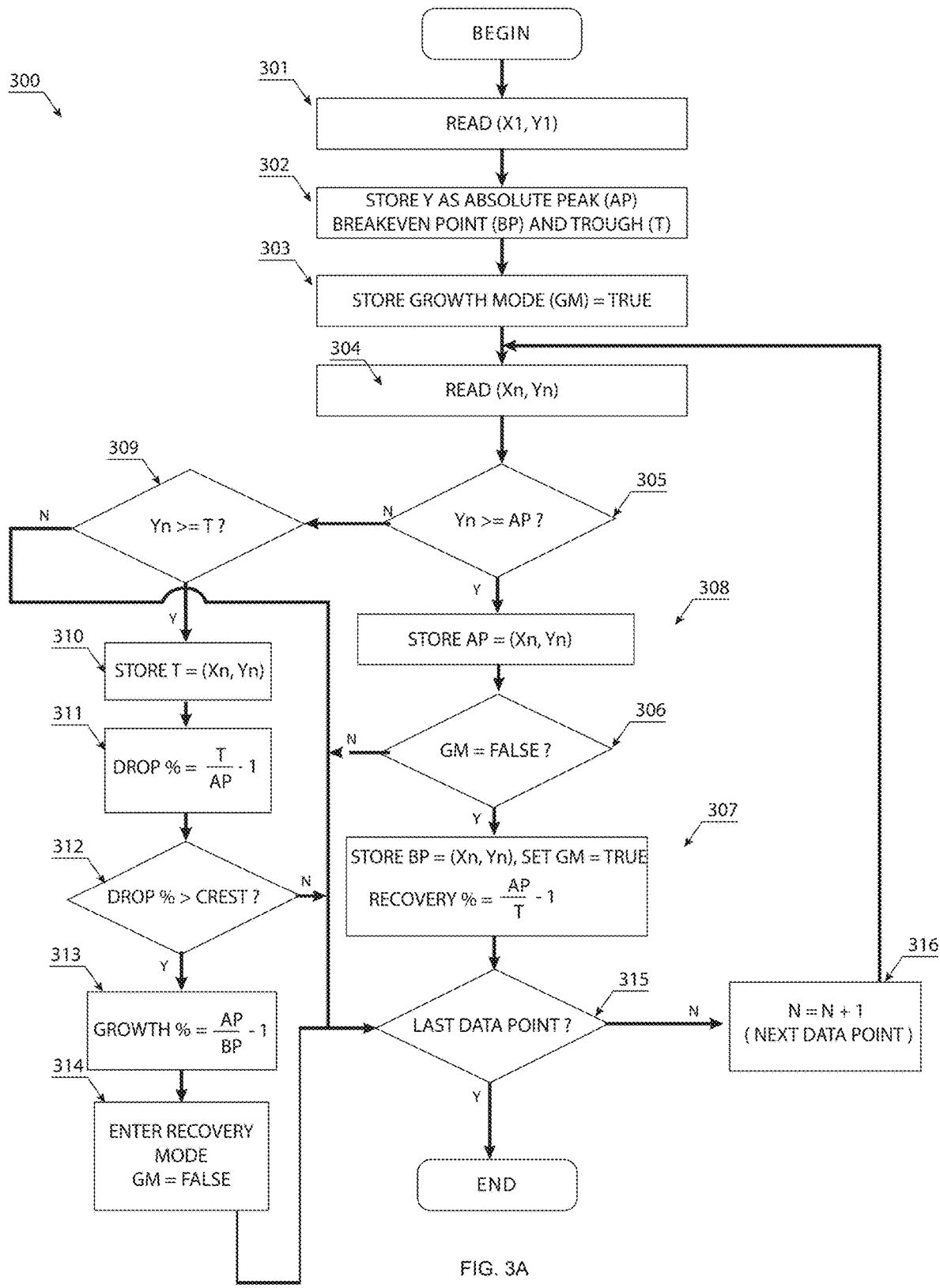
FIG. 3A provides an example of a process implementation to compress a data stream and determine the cycle metrics.

FIGS. 3A-B provides an example of a process implementation to compress a data stream and determine the cycle metrics. The data source can be processed forward, backward, or any combination thereof. As shown in FIG. 1, this process can be executed by a server side module 107 and/or a client side module 102, or load balanced between the two.

In some examples, process 300 may be implemented with different, fewer, or more blocks. Process 300 may be implemented as computer executable instructions, which can be stored on a medium, loaded onto one or more processors of one or more computing devices, and executed as a computer-implemented method.

The processor can:

At 301, read the first (X1, Y1) datapoint from the data stream and set it as the datapoint data structure in FIG. 3B. At 302, store the datapoint value as the absolute peak (AP), breakeven point (BP) & trough (T). In the FIG. 3B cycle data structure, the datapoint is stored as the AbsPeak_AP, Trough_T and Endpoint is set to TRUE. This initializes the starting values of the artifacts being searched for, as shown in FIG. 2 at points 202, 203, and 204. At 303, set the growth mode (GM) Boolean to TRUE which means the processor is searching for the next absolute peak. This is stored in the FIG. 3B process data structure. At 304, read another data point (Xn, Yn) and store is in the DataPoint data structure in FIG. 3B.

At 305, if the Yn datapoint is greater than or equal to the absolute peak (AP) then at 306, if growth mode (GM) is FALSE then the breakeven point has been detected compared to the previous absolute peak. At 307, record this (Xn,Yn) point as the breakeven point (BP) and enter growth mode by setting growth mode (GM) to TRUE in the FIG. 3B process data structure. Calculate the recovery percentage as BP/T−1 which is the percentage change from the trough to the breakeven point. The exact location of the breakeven point (i.e. the exact same Y value of the previous absolute peak) may be between two data points. In this case, the exact location of the breakeven point can be determined using the Pythagorean Theorem, for example. Using this method, the recovery percentage can be determined using AP/T−1 since AP is equal to BP. At 308, the process records this (Xn,Yn) value as the new absolute peak (AP) which is in the cycle data structure of FIG. 3B.

At 309, check if the Yn datapoint is less than trough (T) then at 310, record this (Xn,Yn) value as the new trough (T) at 310 which is stored in the cycle data structure in FIG. 3B. At 311, calculate the new drop percentage from the absolute peak (AP) to the new trough (T) using T/AP−1. These are stored in the cycle data structure of FIG. 3B. Check if drop percentage is greater than crest at 312, then at 313, calculate the growth % as the percentage difference from the previous breakeven point (BP) to the absolute peak (AP) using AP/BP−1. This is stored in the cycle data structure in FIG. 3B. At 314, enter Recover mode and start looking for the new breakeven point by setting growth mode (GM) to FALSE which is stored in the process data structure in FIG. 3B. This means there is a drop that is greater than the crest and we must recover to the breakeven point before growth mode can be entered again.

At 315, the process checks if the last data point has been reached, and if so the process proceeds to End. Otherwise, the process proceeds to get the next data point at 316 and loop to 304.

The data structure in FIG. 3B is an example data structure that can be used to store, transmit, and load balance the process implementation above. A datapoint can be represented by X and Y values. Processing the data stream can use various state variables, such as the ones indicated in FIG. 3A. A single cycle can be represented by a local maximum (absolute peak) datapoint to trough data point using a drop percentage, followed by a growth percentage from the breakeven point to next local maximum. The data stream may also have various indicators at data points. Together, the cycles and indicators make up the entire compressed data stream, including, but not limited to:

The Nth drop percentage followed by

The Nth growth percentage

The Nth recovery percentage can be derived from the Nth drop percentage and therefore does not necessarily need to be stored or transmitted.

Optimizing Levels of Compression and Summarization

Compressing a data stream with a 0% crest (threshold) provides the baseline compression (baseline cycle metrics). Another level of crest can be calculated using the baseline cycle metrics. For example, a crest of 2% can consider drop percentages greater than 2% from the baseline cycle metrics. The growth percentages can be stitched (e.g., concatenated) together. For example, the following formula stitches together the growth percentages from point A to point B and point B to point C: growthpercentageAC=1−(growthPercetageAB+1)*(growthpercentageBC+1).

A data stream compressed using various crest values can be cached to optimize processing, reduce latency, and decrease power consumption. If, for example, a crest of 3% was to be applied to a data stream, the cached crest values for 2% can be used to compute the 3% crest using the technique as described above. Therefore, any crest of N % can be calculated using a compressed data stream with a crest less than N %. The cached data set improves performance because without it, every data point of the data stream would need to be visited and reprocessed every time the user changed the crest percentage. The compression size of the data stream can be reduced by increasing the crest percentage. If the user wants to lower storage requirement of speed distribution and transmission, they can choose a larger crest percentage.

Data Stream Subsets

The cycle metrics can be applied to a subset of the data stream. If the crest remains the constant, the subset can use the cycle metrics from the data stream. However, the endpoints may represent partial cycles relative to the data stream. In this case, the cycle metrics for the partial endpoints are to be recalculated.

Intermediate peaks and troughs are considered absolute peaks and troughs for a subset data stream. Therefore, analyzing a subset of the data stream, zooming into the data stream, or calculated intermediate peaks and troughs may be determined as described above. A large cycle can be split up into smaller cycles using a threshold reset line, which is discuss further below.

Client & Server Caching, Storage, and Load Balancing

The cycle metrics can be calculated on either the client or the server, as shown in FIG. 1 at 102 and 107. The calculations of the cycle metrics can be load balanced between client and server depending on processing resources. For lower bandwidth connections or a client with limited processing capability, the user may choose to calculate the cycle metrics on the server and send the compressed data to the client. Moreover, the cycle metrics for various crests can be transported, calculated, cached, and/or stored, between the client and server. The higher the crest, the higher the compression for the data stream and the more tightly the data stream is compressed.

Calculating cycle metrics based on the set of artifacts can include comparing the first region and the second region to determining a growth percentage, determining a drop percentage associated with the key artifact; and determining a recovery percentage.

Data Stream Compression & Visualization

Figure 4:
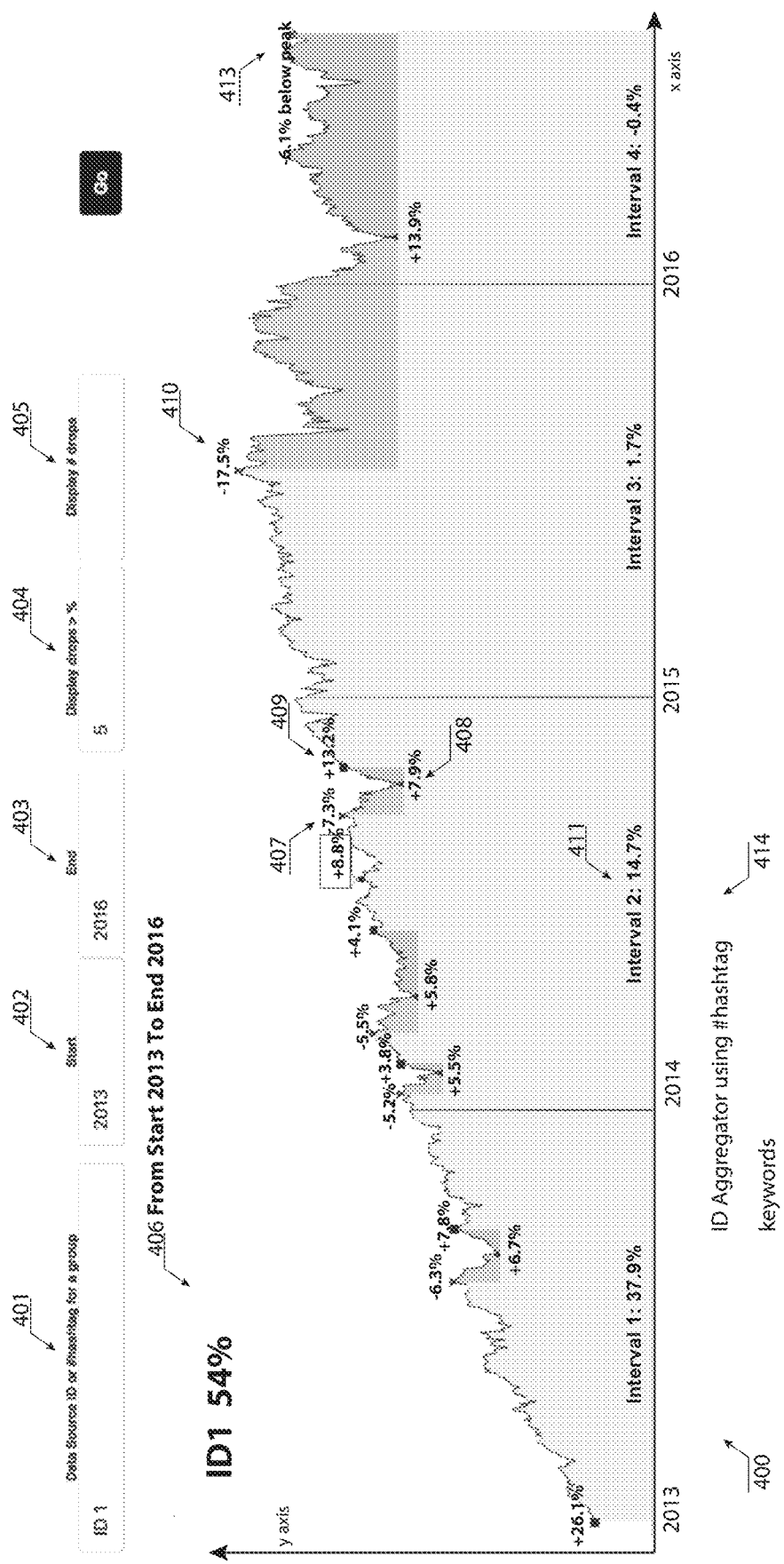

FIG. 4 provides a visualization for the compressed data stream, according to an example implementation.

At point 401, the user can enter multiple unique identifiers for data sources, such as ID1, ID2, etc. These correspond to the data source IDs that are aggregated at the data request aggregator 104 in FIG. 1 and retrieved at the server side module 107. The user can request a large number of data source IDs. The user may aggregate these IDs and associate them with a keyword or hashtag, as shown at point 414. For example, ID1, ID2, ID3 might all be associated with keyword #Tri. Associating multiple data sources with a keyword allows the user to enter an identifier (e.g., ID1, ID2, ID3 at point 401), or enter the keyword (e.g., #Tri) and the processor will resolve to the associated data streams. The processor can mark the display by labeling a set of artifacts with one more colors, icons, keywords, relational data, or graphical overlays.

At point 402, the processor determines the starting point of the data stream (starting X value) and at 403 determines the ending point of the subset of the data stream. The processor can receive input (e.g., user input) to specify a crest for the compression at point 404 or 405. Point 404 "Display drops>%" is a direct request to compress the data with a crest of X %, which will generate N number of cycles. Point 405 "Display # drops" dynamically determines the crest value to generate the specified number of cycles on the chart 400. For example, using a value of 3 at point 405 will show 3 drops for 3 cycles on the chart, not including the last incomplete cycle, if there is a drop.

At point 406, the system generates the total percentage change between 402 and 403 for the system. In some examples, a user specified marker zone is used, as shown in the data compression modules 105 & 109 of FIG. 1.

Point 407 represents a new absolute peak which is an artifact, as illustrated in FIG. 2 at point 205. In this example, the percentage drop from the peak to the trough is −7.3% which can be referred to as the drop percentage. From the trough at point 408, the processor determines a 7.9% recovery, which can be referred to as the recovery percentage. From the breakeven point at 409, the processor determines a 13.2% gain to the next peak at 410 which can be referred to as the growth percentage. From point 409 to 410, the processor determines that a drop of 5% or more did not occur; otherwise the crest would have identified a new cycle. All together, the drop percentage, recovery percentage, and growth percentage can represent one cycle of the cycle metrics.

A user specified interval marker metric or indicator is shown at 411. This is the percentage change of the data points between the two vertical lines which represent the interval. If the data stream subset ends and the endpoint is below the absolute peak, the percentage drop from the absolute peak is shown at point 413. There is another indicator at 412 which represents the percentage change from the indicated point to the end of the chart.

The user can specify a subset of this data stream. For example, the user can request to process the subset of the data stream corresponding to 2014 to 2015. The user may have more than one option. For example, the user can change the Start point at 402 to 2014 and End point 403 to 2015. As another example, the user can click and drag the mouse over the chart to highlight the interval from 2014 to 2015 and the chart will "zoom in." Visually, the cycle metrics appear to be the same, except the first cycle and the last cycle will be truncated and need to be recomputed. However, if the user zoomed in and the "Display # drop" at 405 was, for example, 5, then 5 cycles are computed for the zoomed in subset.

Processing Algorithm Backward and/or Forwards

Figure 5:
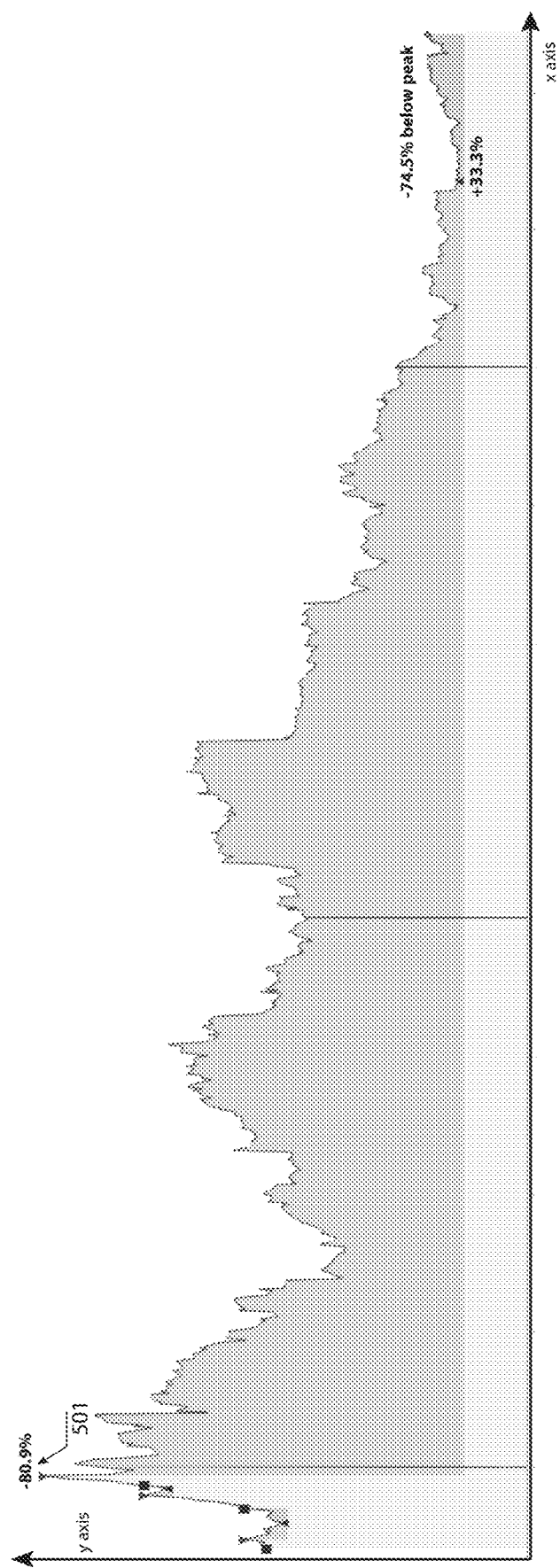
FIG. 5 demonstrates cycle metrics for upward and downward trending data streams that can be processed backward or forward.

FIG. 5 shows a data stream with generally downward sloping data that has an absolute peak at 501. Since the data does not have another absolute peak, the cycle never recovers and no additional cycle metrics are computed beyond peak 501 using the process implementation in FIG. 3 in a forward motion. However, it is noted that the data stream can be processed backwards, which reveals all the absolute peaks and cycle metrics progressing from the far right to left of the chart. Another perspective is to image the mirror image of the chart so the last data point starts first and the first data point is last. Therefore, the algorithm in FIG. 3 can be processed backward, forward, or some combination thereof. As an example, all the data points before the absolute peak 501 can be processed in a forward motion and all the remaining data points can be processed backward starting from the last data point and ending at absolute peak 501.

Correlating Cycles & Indicators With Reasons

FIG. 6 shows a table of cycle metrics and the associated fundamental or interpreted reasons that a cycle change occurred. Later, several example applications will be described for the cycle metrics. One important aspect of the cycle metrics is the ability to associate possible reasons to the cycle and then compare the associated reasons to several data streams, based on that drop.

Figure 9:
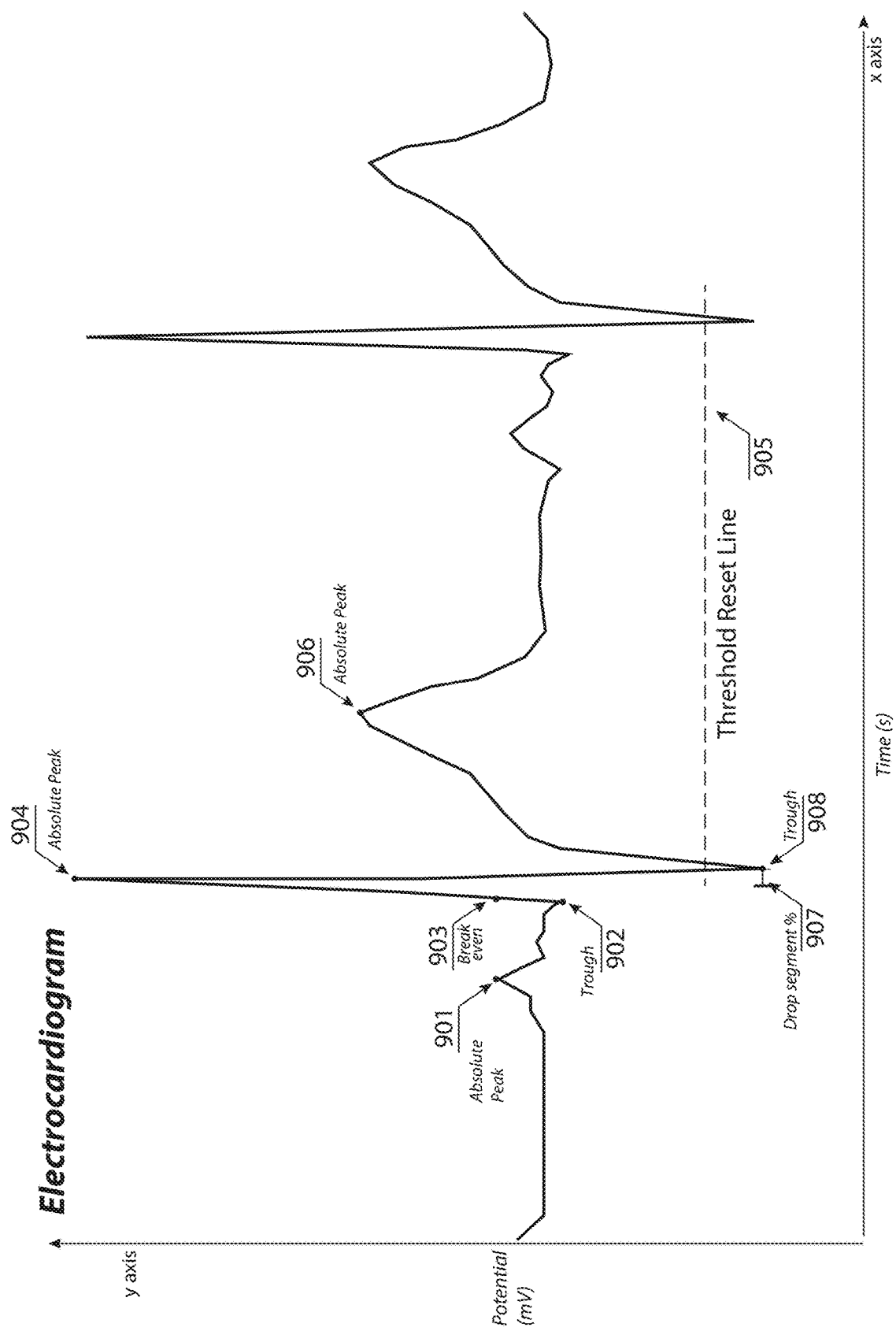
FIG. 9 illustrates an example application for an electrocardiogram data stream.

For example, FIG. 9 is an example application of an electrocardiogram (EKG) data stream. For example, a heart attack can be associated with either an elevated drop percentage from the absolute peak 904 to the trough 908, or an elongated (larger than normal) drop segment percentage at 907. In comparing EKG data streams, for example, the application can chart behaviors to assist in determining which physical characteristics (e.g., weight, gender, and age) correlate with changes in the cycle metrics for EKG data streams of heart attacks.

As another example, FIG. 14 shows historical market data for a stock market index (e.g., the Standard & Poor's 500) with a drop percentage 1405 resulting from the 2007 Global Financial Crisis. This is the interpreted reason attached to the drop percentage change. In comparing financial data streams, for example, the application can chart behaviors to assist in determining which investments had overall good performance but minimized the drop percentage during the Global Financial Crisis.

Reason descriptors can have varying correlations, depending on the resolution of the compression. Using this lossy data compression technique, the resolution that drops nonessential detail from the original data source may highlight artifacts that can be correlated to the reasons. This facilitates interpretation, classification, transmission, processing, and comparisons.

Possible reasons for the cycle metrics, may include, but is not limited to network attack, heartbeat, event start, blood pressure, heart attack, earthquake, virus infection, global warming, population injury, financial crisis, devaluation, abnormality and recovery, population anomaly, etc.

During visualizations, these reasons can be aligned and presented to the user for interpretation. For example, the extent of the drops for two data streams with the same reason can be analyzed. In this way, different reactions to reasons can be analyzed based on the cycle metrics.

Comparing Compressed Data Streams

There are many advantages to compressing data streams into cycle metrics. Among them is the ability to compare data streams to understand differences, similarities, and anomalies.

Figure 7:
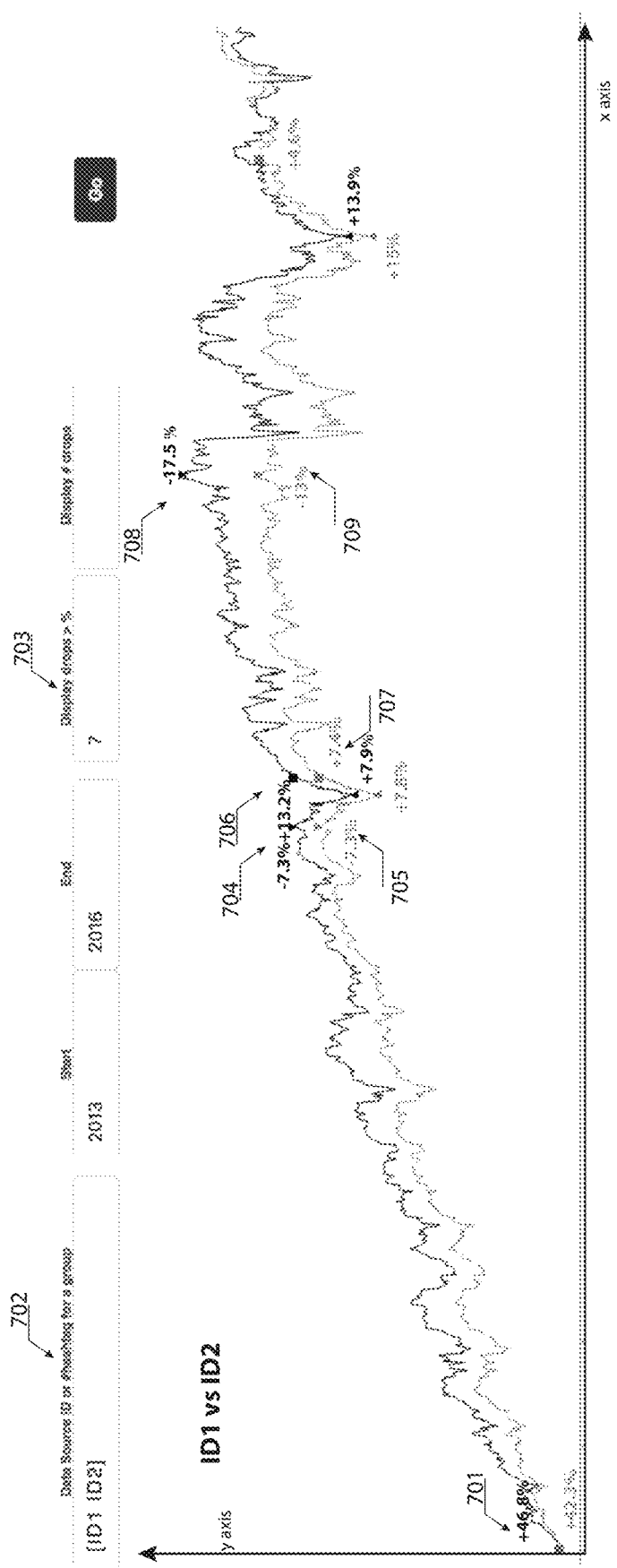
FIG. 7 shows a visualization and comparison of two data streams.

One way to visually compare data streams is to generate the cycle metrics and stack them on top of each other or as a shadow as in FIG. 7. If two data streams are displayed together, as an overlay, or on the chart axes with an offset by a predetermined amount, the user can easily compare differences. To allow for this difference it is important that each dataset is normalized. This means the Start and End periods should match, the intervals on the X axis should match, and the Y values might need to be scaled properly in order to make a fair comparison. These normalizations are done in the data normalization module shown in FIG. 1 at 108. Once normalized, the user can compare the streams: for example, the total percentage change for the two datasets, the interval percentage changes for the dataset, the drop percentages which may match up for correlated datasets, and any of the other user specified or cycle metrics.

As shown in FIG. 6, each dataset might have the same reason for a drop percentage. However, the magnitude of the drop may be different. Comparing the user specified and cycle metrics can help the user understand these differences.

FIG. 7 compares two data streams with the unique identifiers ID1 and ID2. At point 702, [ID1, ID2] is used to signify a comparison chart. Both IDs are processed and compressed with a crest of 7% as shown at point 703. Both of these data sources are normalized so they start at the same Y value as shown at point 701. At the first cycle, both datasets have a drop percentage of −7.3% at 704 & 705. However, ID1 grows by 13.2% at 706 which is significantly higher than the 7.9% growth of ID2 at 707. Following that, ID1 dropped −17.5% at 709 which is significantly more than ID2 which dropped −13% at 709.

Figure 8:
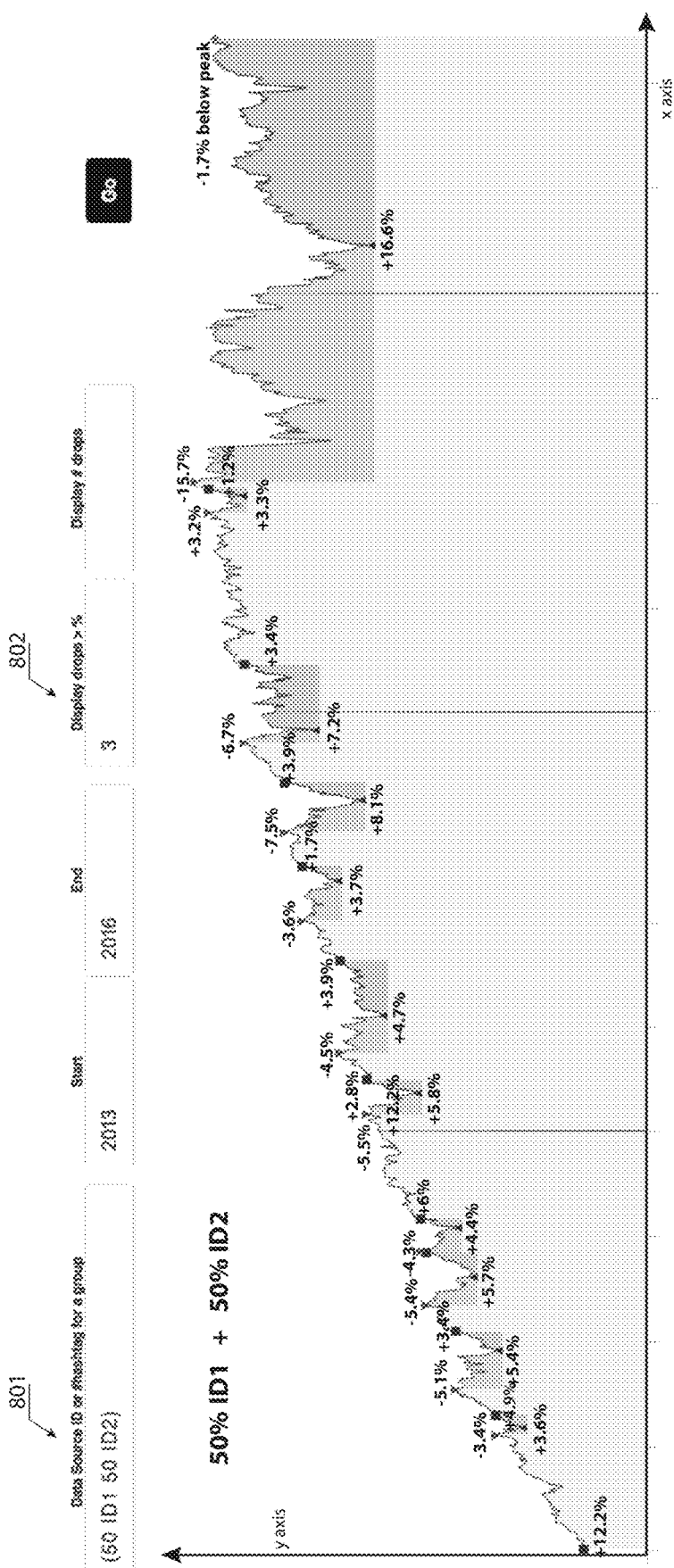
FIG. 8 shows a visualization of two data streams added together, compressed, with the resulting cycle metrics.

FIG. 8 compares two data streams in a different way. At point 801, the user specifies (50 ID1, 50 ID2). This means that 50% of ID1 is added to 50% of ID2 to create a composite data stream. Both data streams ID1 & ID2 are normalized at the data normalization module 108 and the cycle metrics are computed on the composite data stream using a crest of 3% as shown at 802. The result shows how the two data streams behave together. FIG. 8 visualizes the composite data stream with user specified interval and cycle metrics.

Example Application—EKG Potential Data Stream

FIG. 9 shows an EKG Potential data stream where potential is on the Y axis and time is on the X axis. An absolute peak is indicated on the chart at point 901, followed by trough at 902, a breakeven point at 903, and a new absolute peak at 904. Using these key artifacts, the cycle metrics can be computed, including drop, recovery, and growth percentages.

The threshold is reset when the data stream crosses the threshold reset level at 905. At this point, the previous absolute peak is ignored and it is assumed the data stream may not recover to that level. Normally, the point at 906 would be classified as an intermediate peak; however, since the threshold was reset at the 905, the peak at 906 is reclassified to an absolute peak.

A heart attack can be associated with either an elevated drop percentage from the absolute peak 904 to the trough 908, or an elongated (larger than normal) drop segment percentage at 907. In comparing EKG data streams, for example, one can ask the question: "Which physical characteristics such as weight, gender, and age can cause changes to the cycle metrics for EKG data streams leading to heart attacks?"

In this hardware scenario, the Mobile Field Devices (MFD) can be must be optimized for a mission critical application. The processing speed of the MFD may be insufficient and the patient might die if there is any network latency in the calculation and analysis of the cycle metrics. Also, network connectivity could be an issue. In this mission critical application, load balancing and distribution of the computational effort between the client and server is of utmost important. The system may determine the fastest way to get the job done.

Example Application—Earthquake Activity Data Stream

Figure 10:
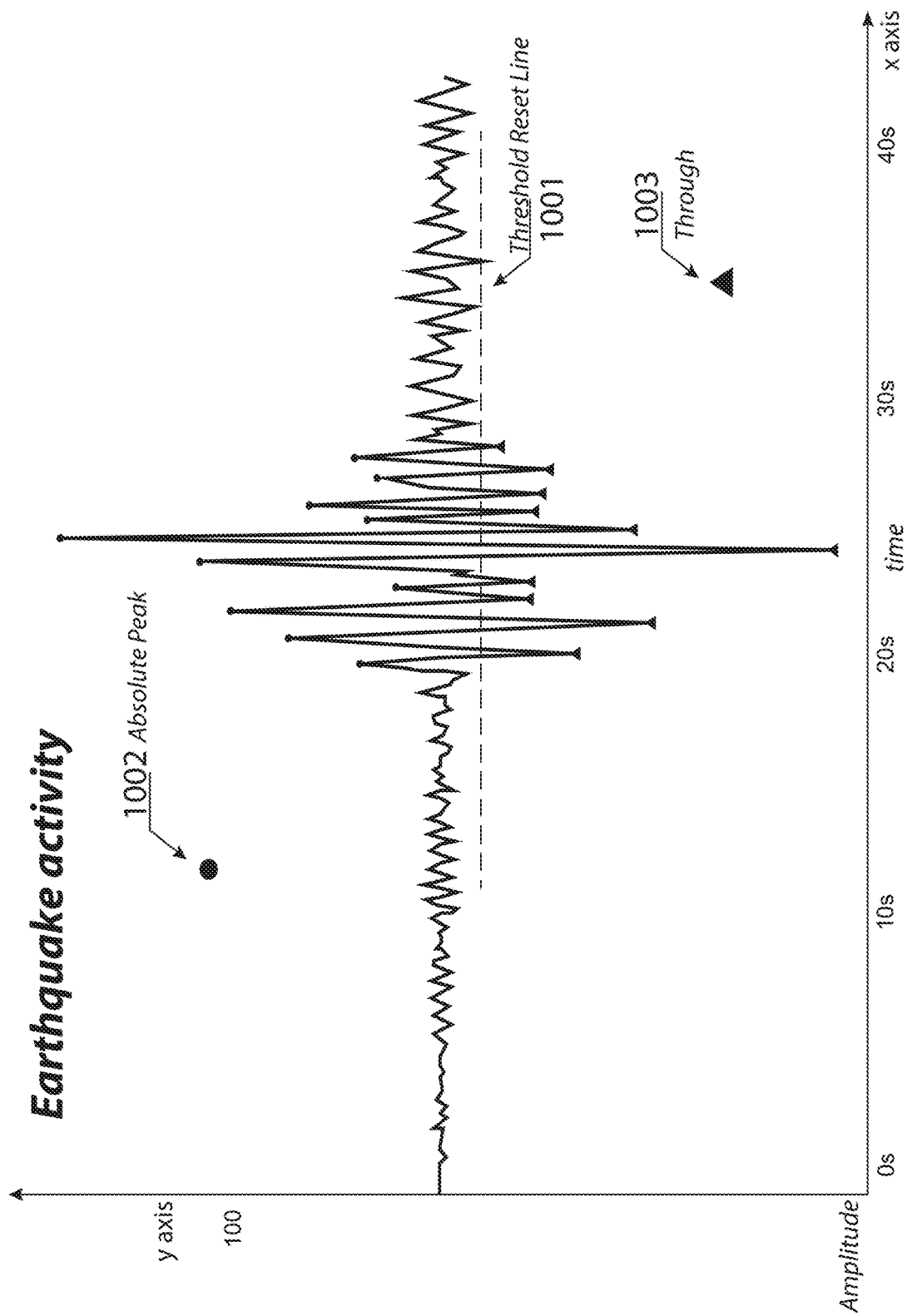
FIG. 10 illustrates an example application of an earthquake activity data stream.

FIG. 10 shows a seismogram for earthquake activity. Point 1001 shows the threshold reset line. If the Y data stream goes below this value, the process algorithm is reset as shown in FIG. 3. This means the next breakeven point for the recovery is not determined. The trough and the next absolute peak after the trough are determined, irrespective of the previous absolute peak.

Point 1002, the dots, show the absolute peaks for the data stream. Point 1003, the triangles, show the troughs for the data stream. The large drop percentages shown in the middle of the chart indicate an earthquake.

Example Application—Global Warming Data Stream

Figure 11:
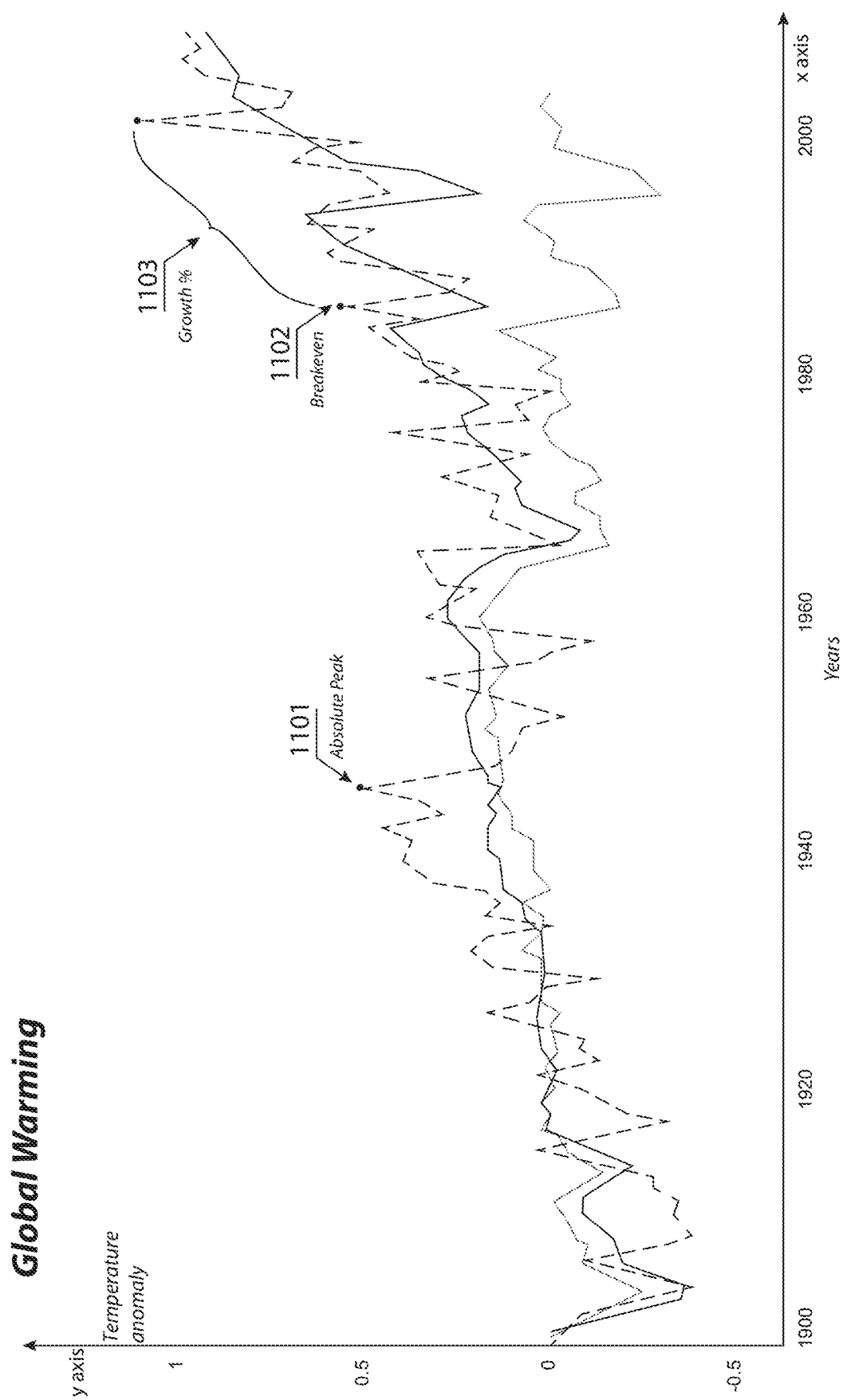
FIG. 11 illustrates an example application for a global warming and a temperature data stream.

FIG. 11 shows the trend of Global Warming with time on the X axis and temperature on the Y axis. The actual measured data stream can be compared with other data streams that are correlated. There was an absolute peak at point 1101, the temperature hit the breakeven point at 1102 and then experienced a growth percentage from 1103.

Example Application—Network Attacks Data Stream

Figure 12:
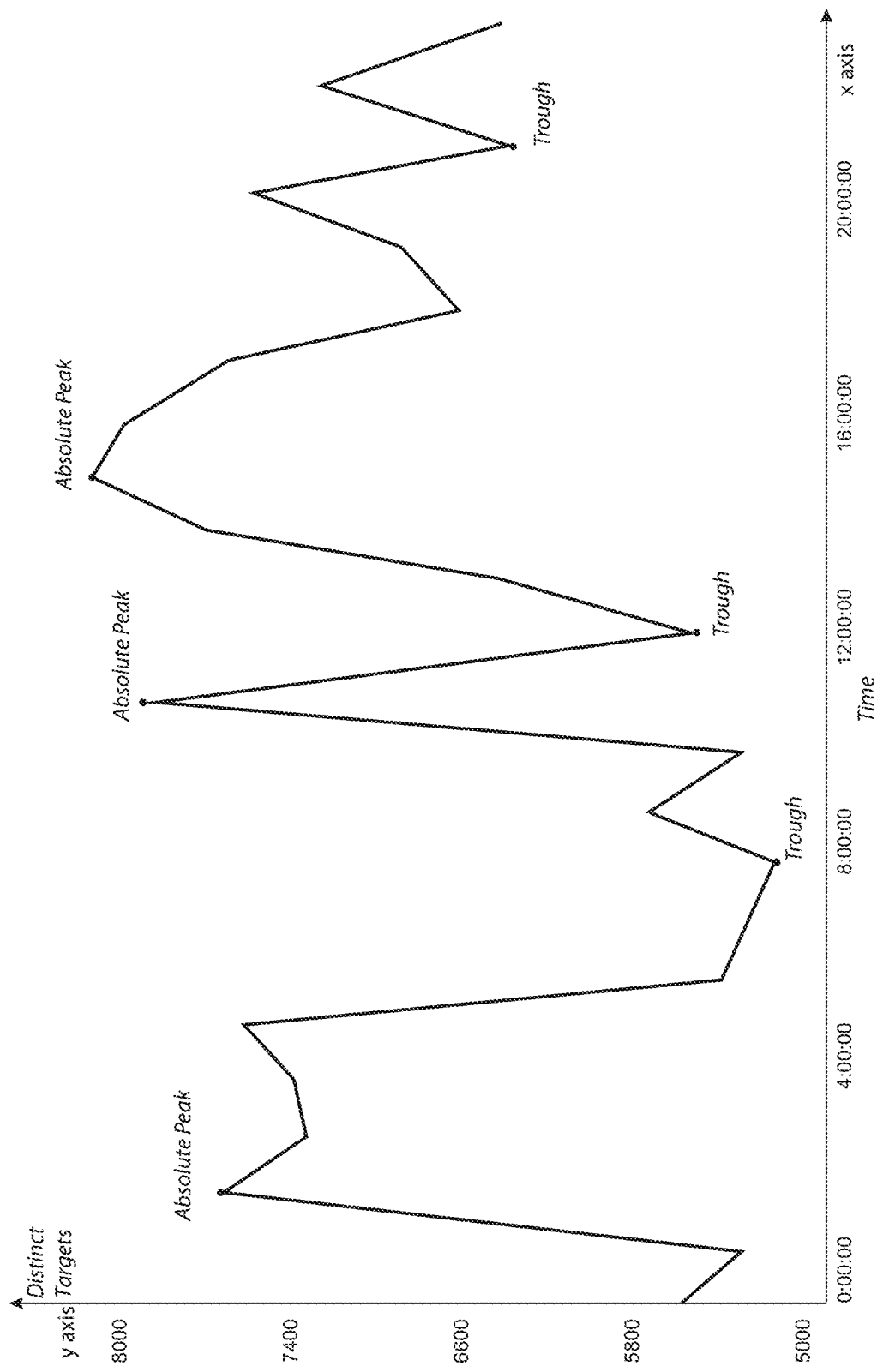
FIG. 12 illustrates an example application for a network attack data stream.

FIG. 12 shows a network attack data stream where distinct targets is on the Y axis and time on the X axis. The absolute peaks and troughs are shown on the chart. The breakeven point can be found by drawing a line from an absolute peak to the right and finding the first data point it intersects. Using these key points, the cycles can be computed: drop percentage, recovery percentage, and growth percentage. Moreover, a reason can be assigned for the cycle metrics and the data stream can be compared with other networks, or other days.

Example Application—Payment Errors Data Stream

Figure 13:
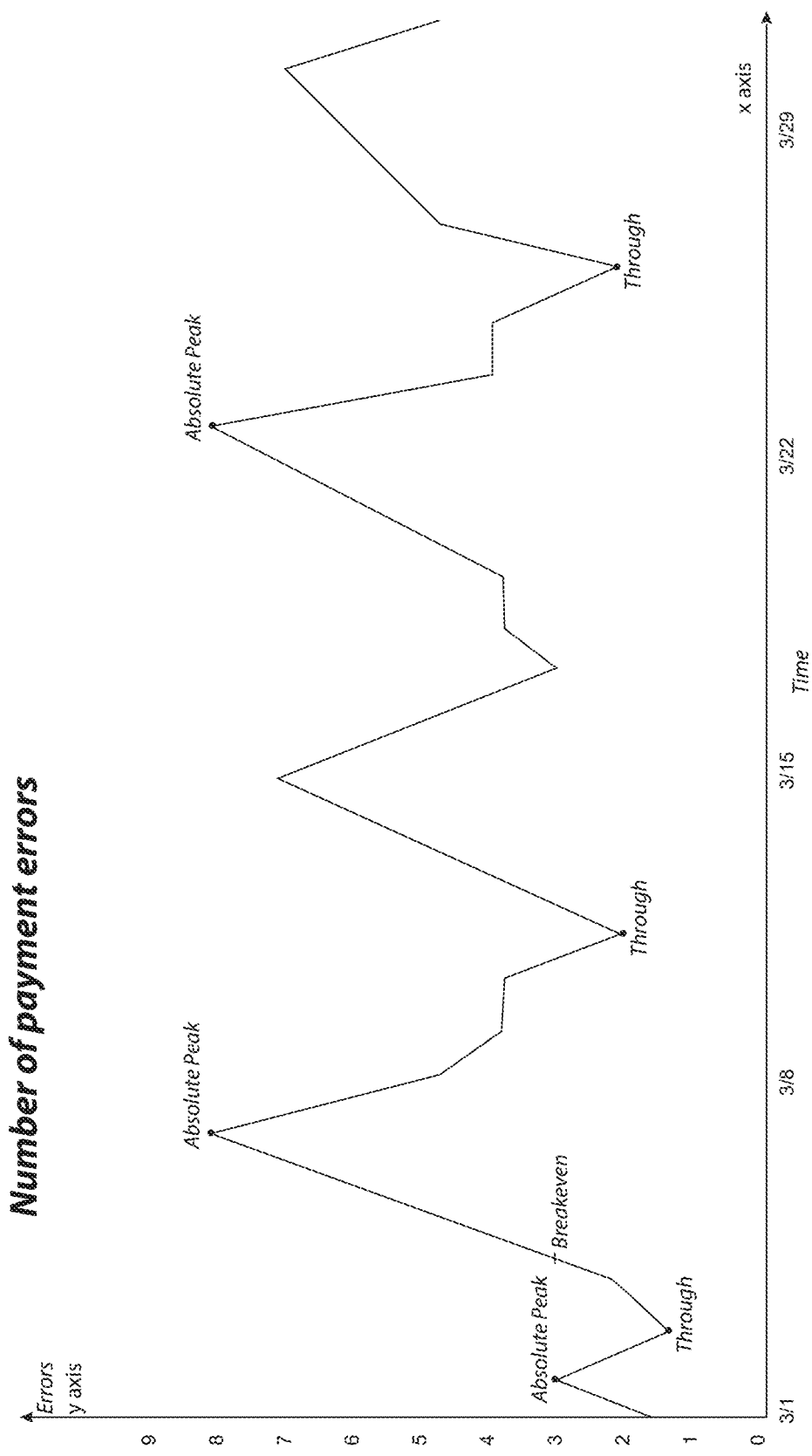
FIG. 13 illustrates an example application for a payment errors data stream.

FIG. 13 shows a data stream where errors is on the Y axis and time on the X axis. The absolute peaks and troughs are indicated on the chart. The breakeven point would be the first data point at the same level as the absolute peak. Using these key points, the cycles can be computed including the drop, recovery, and growth percentages.

For example, the "normal" behavior could be that error occur and are quickly resolved. However, if the number of errors spike, or they are not being resolved quickly, this could be an indication of "abnormal" behavior. Using the growth, drop, and recovery percentages, the "abnormal" behavior of the errors can be identified and visualized.

Example Application—S&P 500 Market Data Stream

Figure 14A:
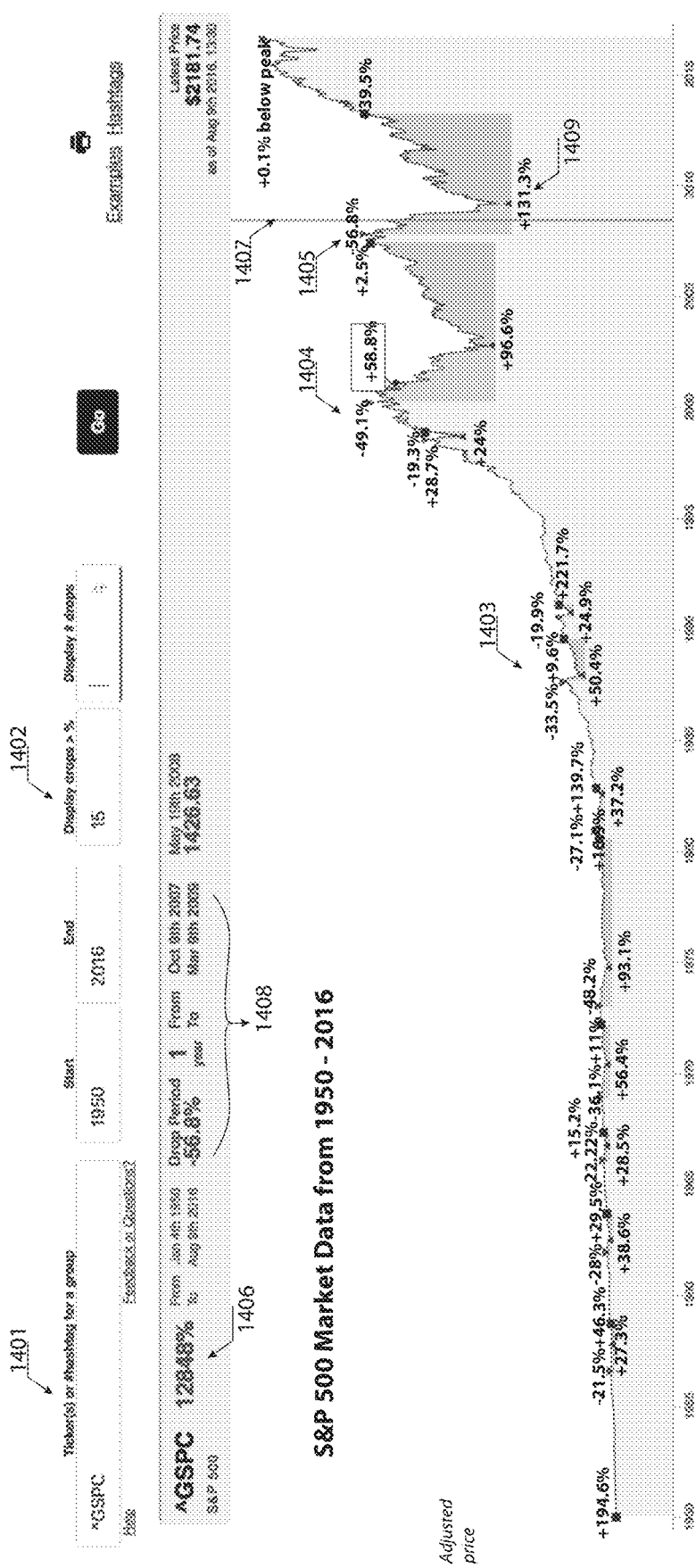
Figure 14B:
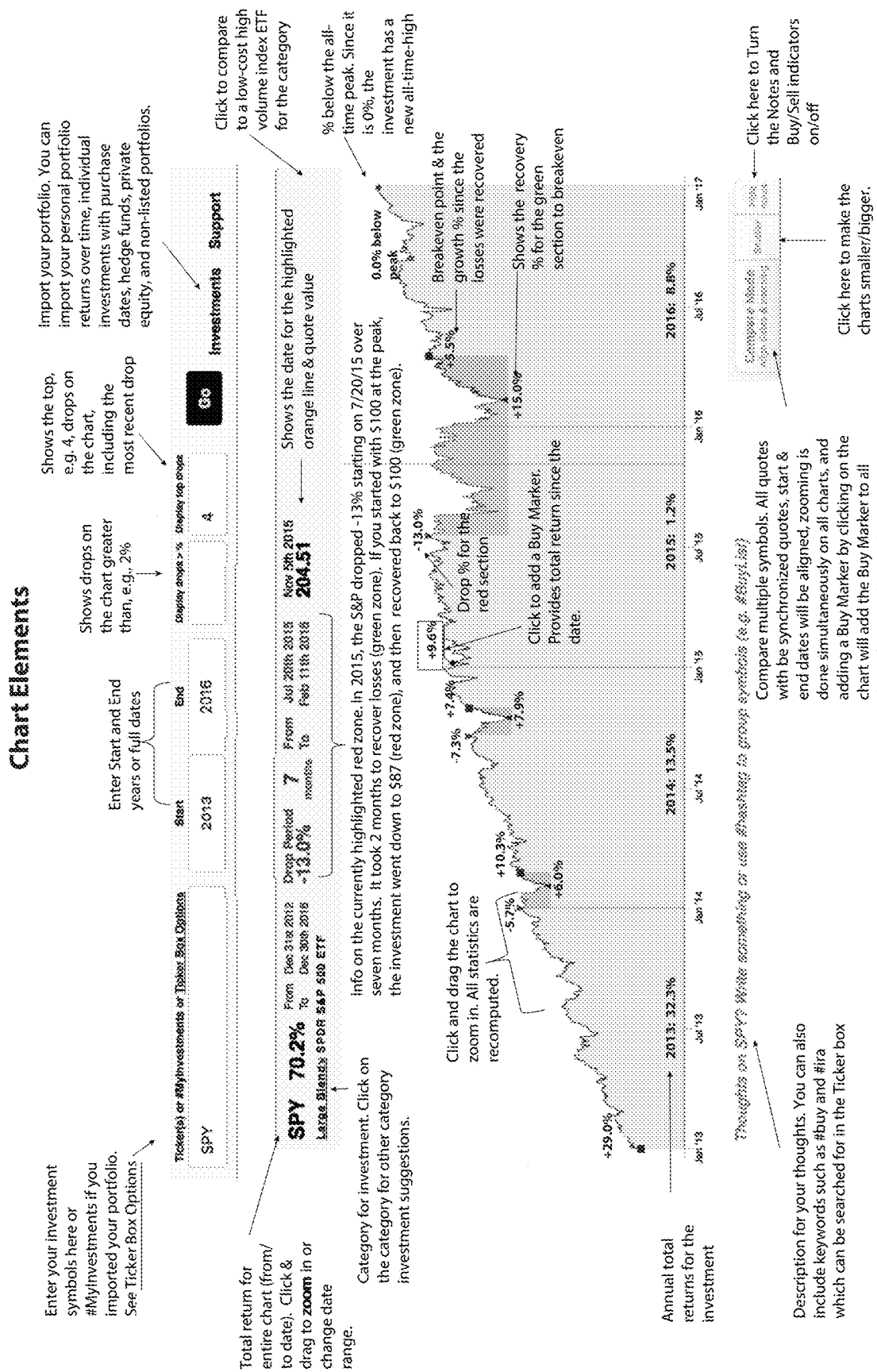

FIG. 14A-C shows a data stream for the S&P 500 start from 1950 until the middle of 2016. The unique identifier for the S&P 500 is entered at point 1401 as ^GSPC. The chart shows all the drops for the S&P greater than a crest of 15% (e.g., drops greater than 15%, also called the threshold) as shown at point 1402. Every major global financial crisis that has happened since 1950 is indicated on the chart. For example, the 1987 crash called Black Monday is shown at point 1403, the technology bubble burst is shown at point 1404, and the Global Financial Crisis is shown at point 1405. Point 1406 shows the total return for the S&P from Jan. 4, 1950 to Aug. 4, 2016 is 12,848%. The vertical line at point 1407 means the cursor is highlighting the drop starting from point 1405 to 1409. The cycle metrics for this region are shown in the header at 1408. As shown, the absolute peak occurred on Oct. 9, 2007 and then dropped −56.8% to the bottom on Mar. 9, 2009. Point 1409 is the trough of the drop region and then the S&P recovered 131.3%, followed by a growth of 39%.

Each drop of more than 15% is associated with a fundamental issue in the market. As shown FIG. 6, each cycle metrics can be associated with a reason. Then, the user can run comparisons and ask questions such as "which investments held up well during the global financial crisis and also exhibited good total return percentages?"

The user can capture a description of their thoughts about the investment using free form text at point 1410. The user can associate the ^GSPC ID with a collection of other IDs by using a keyword, such as #Keyword, in the description shown in the next example.

FIG. 14B provides further detail of each element of the chart. FIG. 14C provides an example of some of the options that can be used in the ticker box at 1401 in FIG. 14A. The examples use the symbols SPY and aggregate bond ETF (AGG) as examples. These are publically traded exchange-traded funds (ETFs). SPY is an ETF for the S&P 500 Index. AGG is an ETF for the Aggregate Bond Index.

Figure 15:
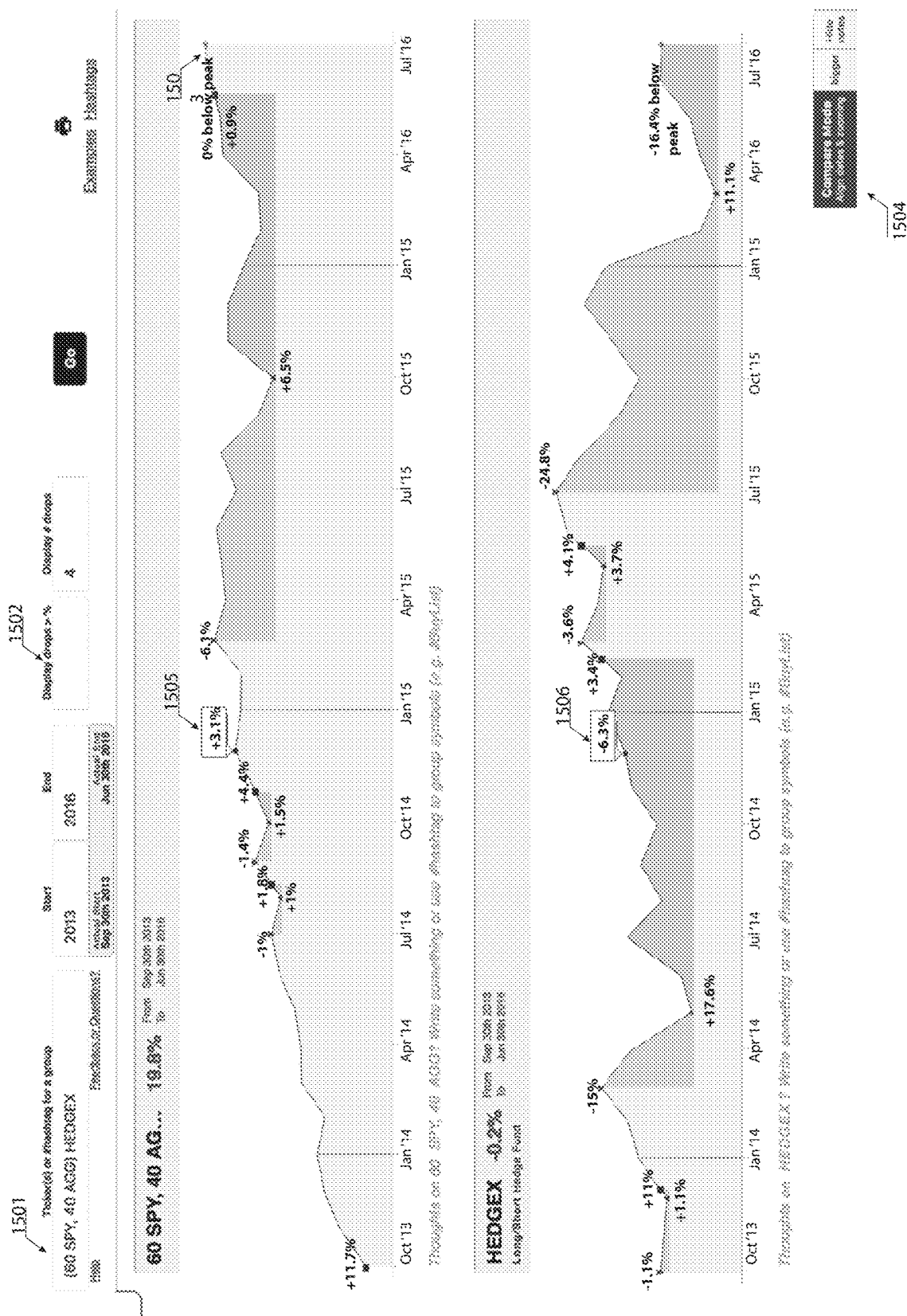
FIG. 15 illustrates an example application comparing a moderate portfolio to a private equity fund, with data streams loaded offline.

Example Application—Comparing a Moderate Portfolio Market Data Stream to a Hedge Market Data Stream FIG. 15 shows a moderate portfolio market data stream compared to a hedge fund portfolio. Point 1501 identifies the request using unique identifiers for the data streams with "(60 SPY, 40 AGG) HedgeX." The (60 SPY, 40 AGG) is an additive portfolio as shown in FIG. 8. When starting with an arbitrary amount of money, say $100 and 60% of it is comprised of SPY and 40% is comprised of AGG. Then, the composite portfolio moves with respect to price fluctuations of each underlying security. A 60% equity and 40% bond portfolio is often called a moderate portfolio in finance. Cycle metrics is used to compare the moderate portfolio to a hedge fund.

The unique identifier for the hedge fund is "HedgeX," was loaded manually using monthly performance data from the fund company. An import file was loaded into the system using the offline data loader 103 in FIG. 1. Point 1502 shows that the compression has been processed to show up to 4 drops. This means the 3 largest drops for the data stream are displayed, plus the last partial cycle.

SPY and AGG are ETFs that are publicly traded. The data streams for these investments provide daily data. However, HedgeX is a non-listed fund and only provides performance on a monthly basis. Clicking on "compare mode" changes the X-axis so the charts line up. The daily quotes for the (60 SPY, 40 AGG) portfolio are transformed into monthly quotes so the quotes match the HedgeX monthly quotes. This happens in the data normalization module 108 shown in FIG. 1. Then, the cycle metrics are computed on the normalized data. The Start and End dates are also lined up. The user can click and drag on the chart to zoom in and see a subset of the data streams. Since compare mode is turned on, the zooming occurs identically for both data streams. Once the zoom occurs, the cycle metrics are recomputed so the top 4 drops are shown as indicated in 1502.

Points 1505 and 1506 are user specified indicators or "buy markers." The point 1505 shows a 9.5% return from that point to the end of the chart on May 31, 2016. In comparison, the point 1506 for HedgeX shows a 22.4% return from the same point to the end of the chart.

Once visualized, it is easier for the brain of the user to perceive which hedge fund has better performance with less drops which means lower portfolio risk. Therefore, the hedge fund has a better risk/reward profile than the moderate portfolio.

Example Application—Predictive Data Analytics Tool

Figure 16:
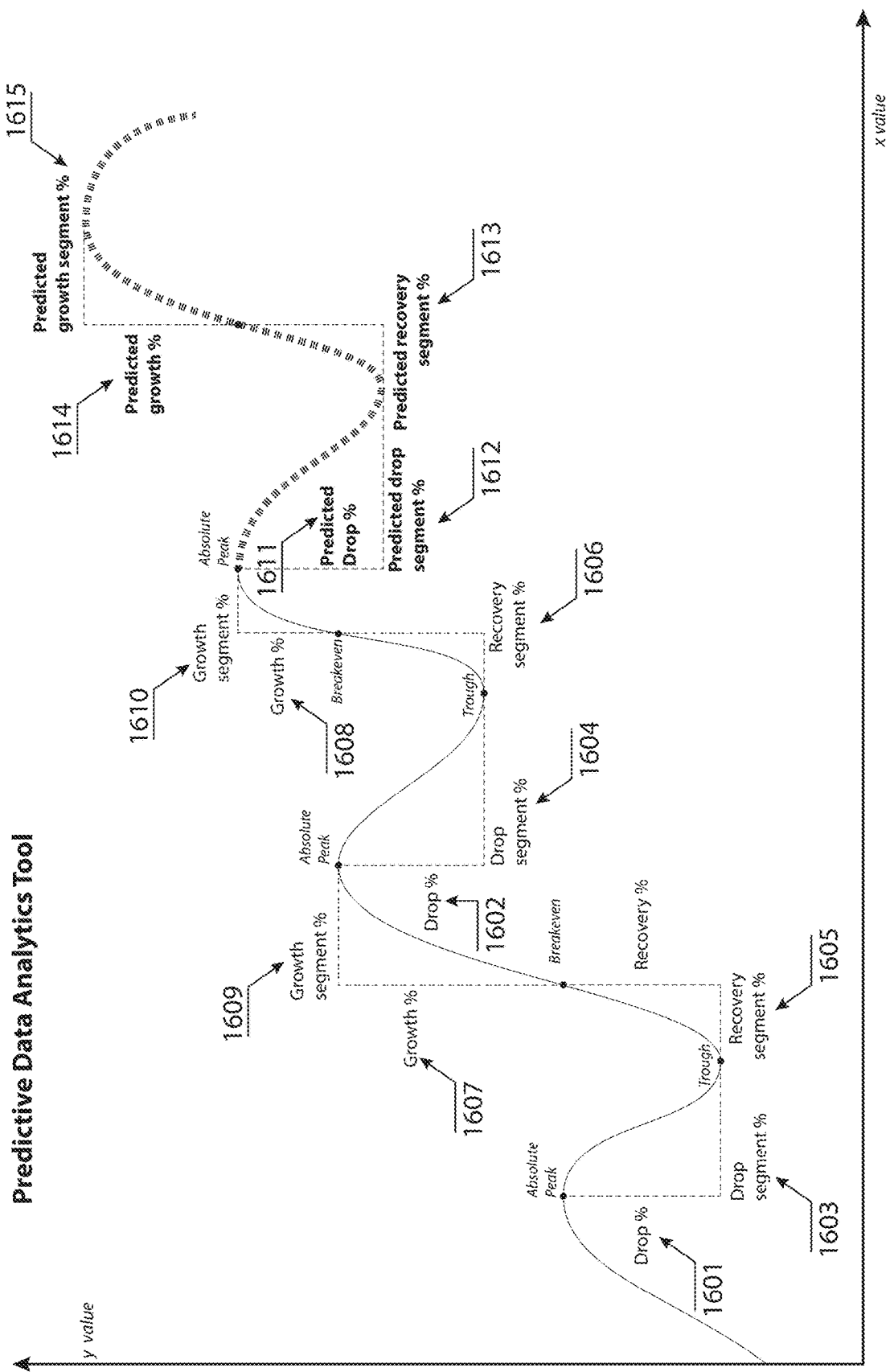
FIG. 16 illustrates a predictive data analytics tool which can be applied to any application, including the previously discussed example applications.

FIG. 16 demonstrates a predictive data analytics tool which can be applied to any application, including the previously discussed example applications.

Given a certain crest threshold which determines the resolution of the compression, there are several artifacts that are found and cycle metrics that are computed. The analyzed subset of the data stream can be used to statistically or deterministically predict future cycles.

The key components of the cycles can be isolated. For example, in FIG. 16 at points 1601 and 1602, the drop percentages can be identified. At points 1603 and 1604, the drop segment percentages can be identified. The recovery segment percentages can be identified at points 1605 and 1606. The growth percentages can be identified at points 1607 and 1608. The growth segment percentages can be identified at points 1609 and 1610.

Using the values for the drop, drop segment, recovery segment, growth, and growth segment percentages, statistical and/or deterministic analysis can be used to predict the unobserved next set of drop, drop segment, growth, and growth segment percentages. In FIG. 16, the predicted drop percentage is shown at 1611, the predicted drop segment percentage is shown at 1612, the predicted recovery segment is shown at 1613, the predicted growth percentage is shown at 1614, and the predicted growth segment percentage is shown at 1615.

Any statistical or other means can be used to determine the predicted cycles, depending on the application and the nature of the data stream. For example, the drop, drop segment, recovery, growth, and growth segment percentages can be averaged. In some examples the median can used for predicting cycles, a worst case for the percentages can be used to predict the worst case for an unobserved cycle, or the percentages can be applied to a probability distribution curve and the unobserved cycles predicted based on assigned probabilities.

Processing Environment

Figure 17:
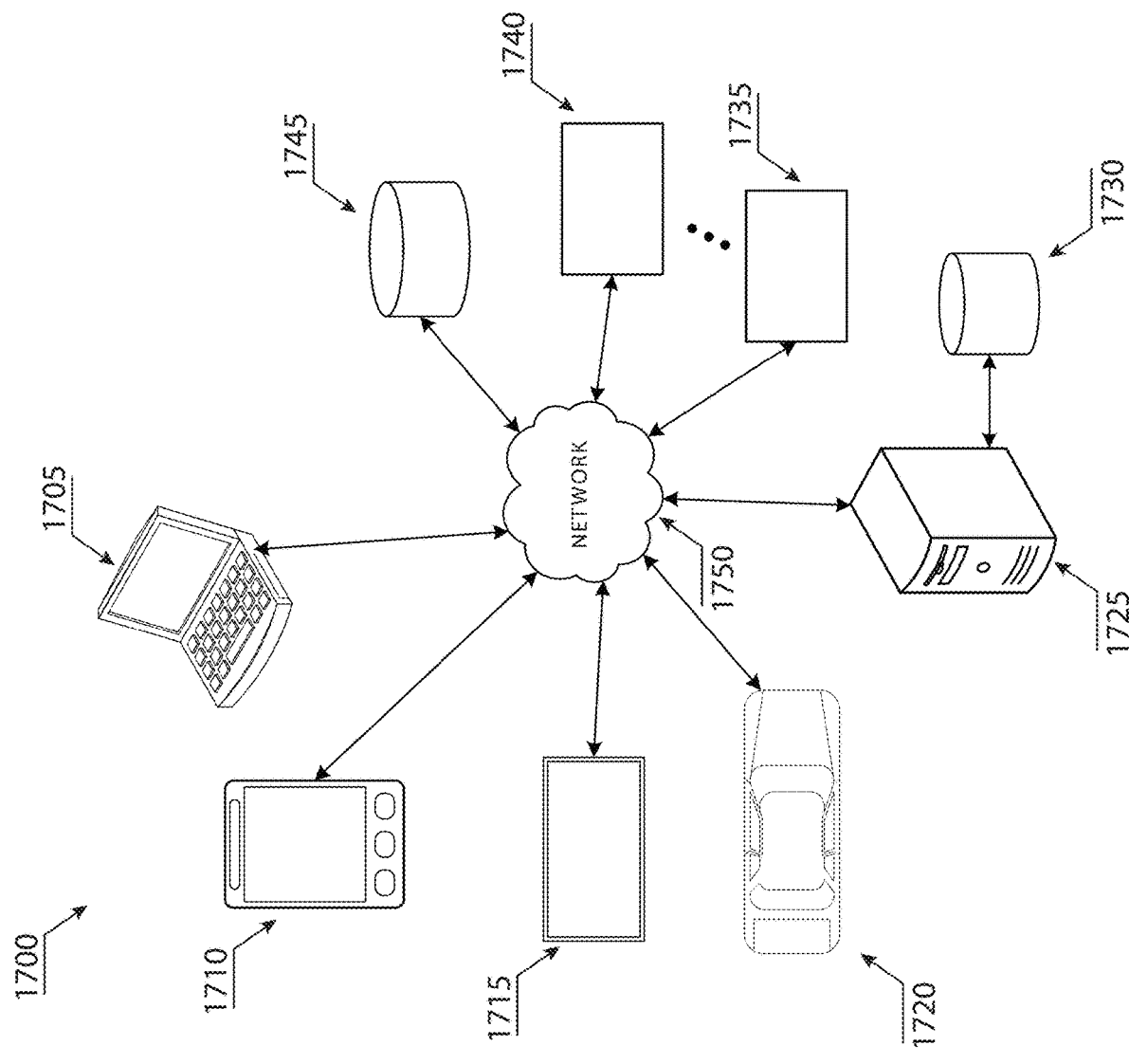
FIG. 17 shows an example environment suitable for some example implementations.

FIG. 17 shows an example environment suitable for some example implementations. Environment 1700 includes devices 1705-1745, and each is communicatively connected to at least one other device via, for example, network 560 (e.g., by wired and/or wireless connections). Some devices may be communicatively connected to one or more storage devices 1730 and 1745.

Figure 18:
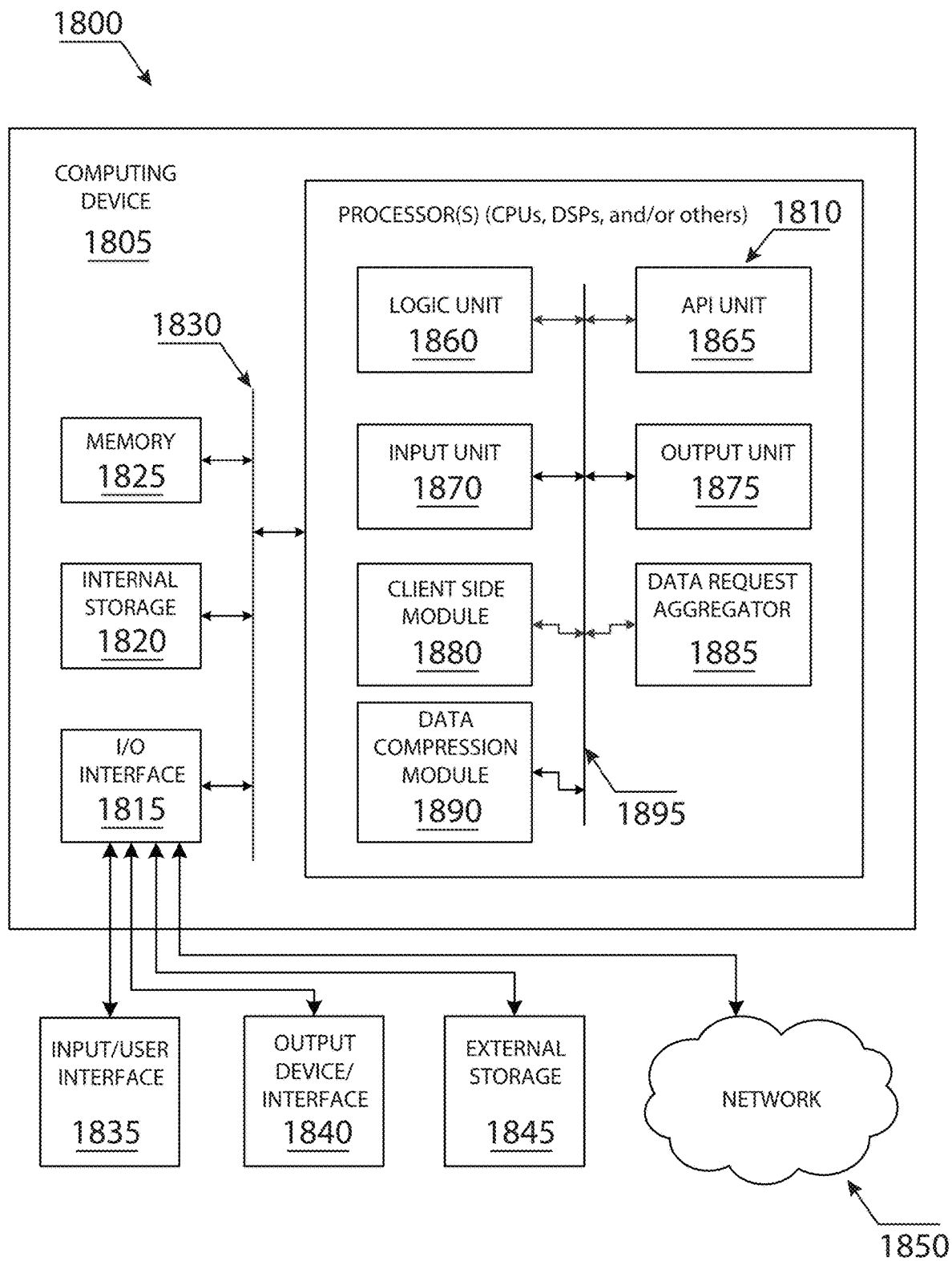
FIG. 18 shows an example computing environment with an example computing device suitable for use in some example implementations.

An example of one or more devices 1705-1745 may be computing device 1805 described in FIG. 18. Devices 1705-1745 may include, but are not limited to, a computer 1705 (e.g., a laptop computing device), a mobile device 1710 (e.g., smartphone or tablet), a television 1715, a device associated with a vehicle 1720, a server computer 1725, computing devices 1735-1740, storage devices 1730 and 1745.

For example, FIG. 9 shows the analysis of an EKG Potential data stream. In this environment, the user has a tablet as shown in FIG. 17 device 1710. The tablet is computing with a server as depicted in FIG. 1. Point 107 server may be a device like 1725. Since this is a mission critical application, the tablet could work in a connected or unconnected environment. In contrast, determining network attacks in FIG. 12 does not does necessarily require a mobile field device for analysis, and therefore, the computation and compression of the data stream by the data compression module at FIG. 1 109 can be done at the server. In general and in some implementations, devices 1705-1720 may be considered user devices. Devices 1725-1645 may be devices associated with service providers. For example, a user (e.g., Alice) may access, view, and/or share content or a webpage using user device 1705 or 1710 on a social network supported by one or more devices 1725-1745. A recipient (e.g., Bob) may access and/or view Alice's shared content using device 1715 or 1720.

FIG. 18 shows an example computing environment with an example computing device suitable for use in some example implementations. Computing device 1805 in computing environment 1800 can include one or more processing units, cores, or processors 1810, memory 1825 (e.g., RAM, ROM, and/or the like), internal storage 1820 (e.g., magnetic, optical, solid state storage, and/or organic), and/or I/O interface 1815, any of which can be coupled on a communication mechanism or bus 1830 for communicating information or embedded in the computing device 605.

Computing device 1805 can be communicatively coupled to input/user interface 1835 and output device/interface 1840. Either one or both of input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1840 may include a display, television, monitor, printer, speaker, braille, or the like. In some example implementations, input/user interface 1835 and output device/interface 1840 can be embedded with or physically coupled to the computing device 1805. In other example implementations, other computing devices may function as or provide the functions of input/user interface 1835 and output device/interface 1840 for a computing device 1805.

Examples of computing device 1805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1805 can be communicatively coupled (e.g., via I/O interface 625) to external storage 1845 and network 1850 for communicating with any number of networked components, devices, and systems, including one or more computing devices of the same or different configuration. Computing device 1805 or any connected computing device can be functioning as, providing services of, or referred to as a server, client, thin server, general machine, special-purpose machine, or another label.

The I/O interface 1815 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 1815 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computing device 1805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1810 can execute under any operating system (OS) (not shown), in a native or virtual environment. One or more applications can be deployed that include logic unit 1760, application programming interface (API) unit 1865, input unit 1870, output unit 1875, client side module 1880, data request aggregator 1885, data compression module 1890, and inter-unit communication mechanism 1895 for the different units to communicate with each other, with the OS, and with other applications (not shown). For example, client side module 1880, data request aggregator 1885, data compression module 1890 may implement one or more processes shown in FIGS. 3-8. The described units and elements can be varied in design, function, configuration, or implementation and are not limited to the descriptions provided.

In some example implementations, when information or an execution instruction is received by API unit 1865, it may be communicated to one or more other units (e.g., logic unit 1860, input unit 1870, output unit 1875, client side module 1880, data request aggregator 1885, data compression module 1890). For example, after input unit 1870 has detected a user indication, feedback, or a textual change in the IDs for the data sources, input unit 1870 may use API unit 1865 to communicate the user indication to client side module 1880. The client side module 1880, via API unit 665, interact with the data request aggregator 1885 to detect and process the request by aggregating data source IDs and communicating with the server over Network 1850 and wait for a response.

Meanwhile, the server may have a similar computing device environment as in FIG. 18. As shown in FIG. 1, the server may request the raw data from the data sources, normalize the data, and the pass it to the data compression module to generate the cycle metrics with, for example, a 0% crest. The resulting compressed data may then pass back to the client computing device data request aggregator 1885. At the client, the compressed data stream may be cached at either internal Storage at 1820 or Memory 1825. Using API unit 1865, client side module 1880 may interact with data compression module 1890 to determine if the data stream should be further compressed.

In some instances, logic unit 1860 may be configured to control the information flow among the units and direct the services provided by API unit 1865, input unit 1870, output unit 1875, client side module 1880, data request aggregator 1885, data compression module 1890 in some example implementations described above. For example, the flow of one or more processes or implementations may be controlled by logic unit 660 alone or in conjunction with API unit 665.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-supported software application, and/or as a mobile application.

Although only a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of the present application include, but are not limited to:

Compressing data streams into a series of metrics including, but not limited to, dynamically finding key artifacts such as high points (peak points), low points (trough points), breakeven points, interval points, user specified points and generating the percentage difference between these artifacts, which is called cycle metrics.

A chart of a data stream that dynamically generate cycles and drops based on "Display drops>%" or "Display the top # of drops" permits the user to dynamically control the resolution of the data compression based on a specified crest.

Comparing data from multiple data streams using the compressed data and cycle metrics to visualize risk and reward, for example, in financial services. The charts for various time periods can highlight a portfolio underperforming an index by comparison and allows users to quickly visualize performance differences. For the underperforming portfolio, drops will be larger than the index and the Total Return will be smaller than the lower cost index for various time periods.

The system also provides charts that provide performance markers to indicate when the user has bought an investment and the % return from that point to the end of the chart. The user can build a "watch list" using hashtags in the description field of the chart.

The algorithms that speed up the hardware and network between the client and server. The tool allows for the dynamic compression and visualization of cycles to occur quickly.

The ability to cache the cycles and dynamically compress the data stream with various crests in an optimized way.

The ability to load balance the cycle metric calculations between the client and server to permit visualizations to occur.

The ability to visually display the results of the data stream compression.

Additional aspects of the present application include, but are not limited to:

A method of interpreting complex events including receiving a data stream of relational data; receiving a set of event data structures, where each event data structure describes a complex event and cycle metrics associated the complex event; identifying locations in the relational data associated with the set of event data structures; and generating a display of the relational data, where the display includes identifying event information associated one or more event data structures based on one or more cycle metrics.

The method of interpreting complex events can further include the set of event data structures that include one or more of: a benchmark artifact indicating a first relational value comparable to a second relational value associated with the complex event; or a peak artifact indicating a relative change of the complex event, where the peak artifact is associated with another critical point after the benchmark artifact.

The method of interpreting complex events can further include complex events that include a first range including a benchmark artifact and a first local peak value; and a second range including the benchmark artifact and a peak artifact.

The method of interpreting complex events can further include identifying locations based on matching a relational value of the relational data with a key value of at least one of the set of event data structures.

The method of interpreting complex events can further include displaying event information associated with the one or more event data structures based on the one or more cycle metrics meeting a threshold. For example, the display can include event information for growth events associated with a growth metric over five percent. That is, the display can include an overlay of event information for each complex event satisfying the threshold in a selected range of the relational data.

The method of interpreting complex events can further include displayed event information filtered based one or more cycle metrics of the one or more event data structures to display a number of ranked events associated with a selected cycle metric. For example, filtering based on cycle metrics of a growth percentage can display a ranked number of top growth events with the largest growth percentages. That is, the display can include an overlay for the top ten growth events of a selected range in the relational data.

Further aspects of the present application include, but are not limited to:

A non-transitory computer readable medium including instructions when executed by a processor to: receive a data stream of relational data; detect an artifact in the data stream associated with a critical point in the relational data; analyze, by a processing device, the artifact to determine a set of artifacts associated with a complex event where the critical point is an endpoint of the complex event; calculate one or more cycle metrics based on the set of artifacts; generate a data structure to describe the complex event and cycle metrics; and provide the data structure for marking a display of the relational data with the complex event based on the cycle metrics.

The non-transitory computer readable medium of can further include the set of artifacts that include a benchmark artifact indicating a relational value comparable to a relational value associated with the artifact; a peak artifact indicating a relative change based on the artifact, where the peak artifact is associated with another critical point after the benchmark artifact; and the processor is further to: identify a first range based on the artifact and the benchmark artifact, where the first range including a first local peak value; identify a second range based on the benchmark artifact and peak artifact.

The non-transitory computer readable medium is further to calculate one or more cycle metrics based on the set of artifacts, the processor is further to: compare the first region and the second region to determining a growth percentage; determine a drop percentage associated with the artifact; and determine a recovery percentage.

The non-transitory computer readable medium can further include the processor is to transmit the data structure to a remote device with access to the data stream, where the remote device is to display the relational data marked with the set of artifacts based on the data structures and generate a display of the relational data labeled with event information based on the identified locations.

I claim:

1. A method comprising:
  receiving a stream of data;
  generating a series of event cycle metric data structures that including a benchmark point of interest and a first local peak value and a second range including the benchmark point of interest and a second peak point of interest,
  wherein the event cycle metric data structures includes one or more of:
  a benchmark point of interest indicating a first relational value comparable to a second relational value associated with a complex event; and
    a peak point of interest indicating a relative change of the complex event, wherein the peak point of interest is associated with another critical point after the benchmark point of interest,
  wherein to calculate one or more metrics based on the set of points of interest, the first range is compared to the second range to determine a growth percentage, to determine a drop percentage associated with the point of interest, and to determine a recovery percentage;
  generating a display of the data, wherein the display comprises identifying event information associated one or more event data cycle metric structures based on one or more of the metrics;
  receiving another stream of another set of data; and
    generating a display of the data with the another set of data to visualize discrete differences in the stream and the another stream, and
  zooming in on a region of the display and determining one or more new metrics associated with the one or more cycles, for identifying event information to display a subset of the data stream at a higher resolution and greater level of detail based on the size and resolution of the output device,
  wherein the display and the resolution of the output device comprising event information associated one or more of the event cycle metric data structures is based on the one or more metrics meeting a threshold that is inversely associated with a number of the one or more cycles in the complex event and directly associated with a resolution associated with displaying of the complex event on the output device, wherein the data stream is compressed by a processor to generate a compressed data stream, by removing non-essential data from the data stream based on a desired resolution of display on the output device and one or more of (1) a speed and a current load of a cloud server associated with the processor, (2) a bandwidth of a network, and (3) a speed of the processor on a client based on a size and a resolution of the output device and a type of the client, and
  wherein the peak point comprising a local maximum point or a local minimum point is defined based on the threshold including a higher threshold representing a lower resolution of a lossy compression system for display on the output, and a lower threshold representing a higher resolution of the lossy compression system for display on the output, to control the visualization overlay details associated with the size and resolution of the output device, so as to separate noisy data from essential data, wherein for a network architecture comprising the client coupled to the cloud server, the cloud server and the client each maintains a copy of a data compression module for balancing of a processing load between the client and the cloud server in a manner that optimizes performance of the network architecture, and an input for the data compression module comprises the threshold that controls the resolution associated with display of the compressed data stream on the output device, from plural data sources and an amount of data communicated between the client and the cloud server.

2. The method of claim 1, further comprising identifying locations in the data associated with the event cycle metric data structures based on matching a relational value of the data with a key value of at least one of the event cycle metric data structures.

3. The method of claim 1, wherein that displayed event information is filtered based on the one or more metrics of the event cycle metric data structures to display a number of ranked events associated with a selected one or the one or more metrics.

4. The method of claim 1, further comprising:
  receiving another stream of another set of data;
    identifying locations in the another set of data associated with the event cycle metric data structures, wherein identifying locations in the another set of data comprises normalizing the another set of data; and generating a display of the normalized data including the data with the another set of data to display event information at a point of the normalized data.

5. The method of claim 1, wherein the display of event information based on the one or more metrics includes one or more of: labels, keywords, or colors.

6. The method of claim 1, wherein the event cycle metric data structures is received from a different source than the stream.

7. The method of claim 1, wherein the client comprises one or more of a mobile field device, a laptop, a mobile phone, and a tablet.

8. The method of claim 1, wherein for the cloud server having a faster processing speed than the client and the network, a compression algorithm is processed on the cloud server with the lower resolution and the higher threshold, in a manner that reduces the amount of data that is required to be received and processed by the client.

9. The method of claim 1, wherein for the client having a faster processing than the server, the processing load is shifted to the client.

10. The method of claim 1, wherein for the network and the cloud server having a faster processing speed than the client, the server pre-processes and compresses the data with the higher resolution in a manner that retains the one or more cycles and provides the compressed data to the client for processing in a dynamic manner based on input from the user in a manner that reduces network traffic.

11. The method of claim 1, wherein, in a low bandwidth environment, a high threshold provides for filtering out of non-essential data to optimize transmission through the network, and in a high bandwidth environment where the client has a greater processing capability than the cloud server, the cloud server pre-processes the cycle metrics with a lower threshold in a manner that provides greater detail to the client.

12. The method of claim 1, wherein the client is configured to dynamically change the resolution of the data stream for display on the output device based on a cached version of the compressed data stream.

* * * * *